Sept. 14, 1954　　　F. R. McFARLAND　　　2,689,029
TRANSMISSION
Original Filed Jan. 15, 1949　　　　　　6 Sheets-Sheet 1
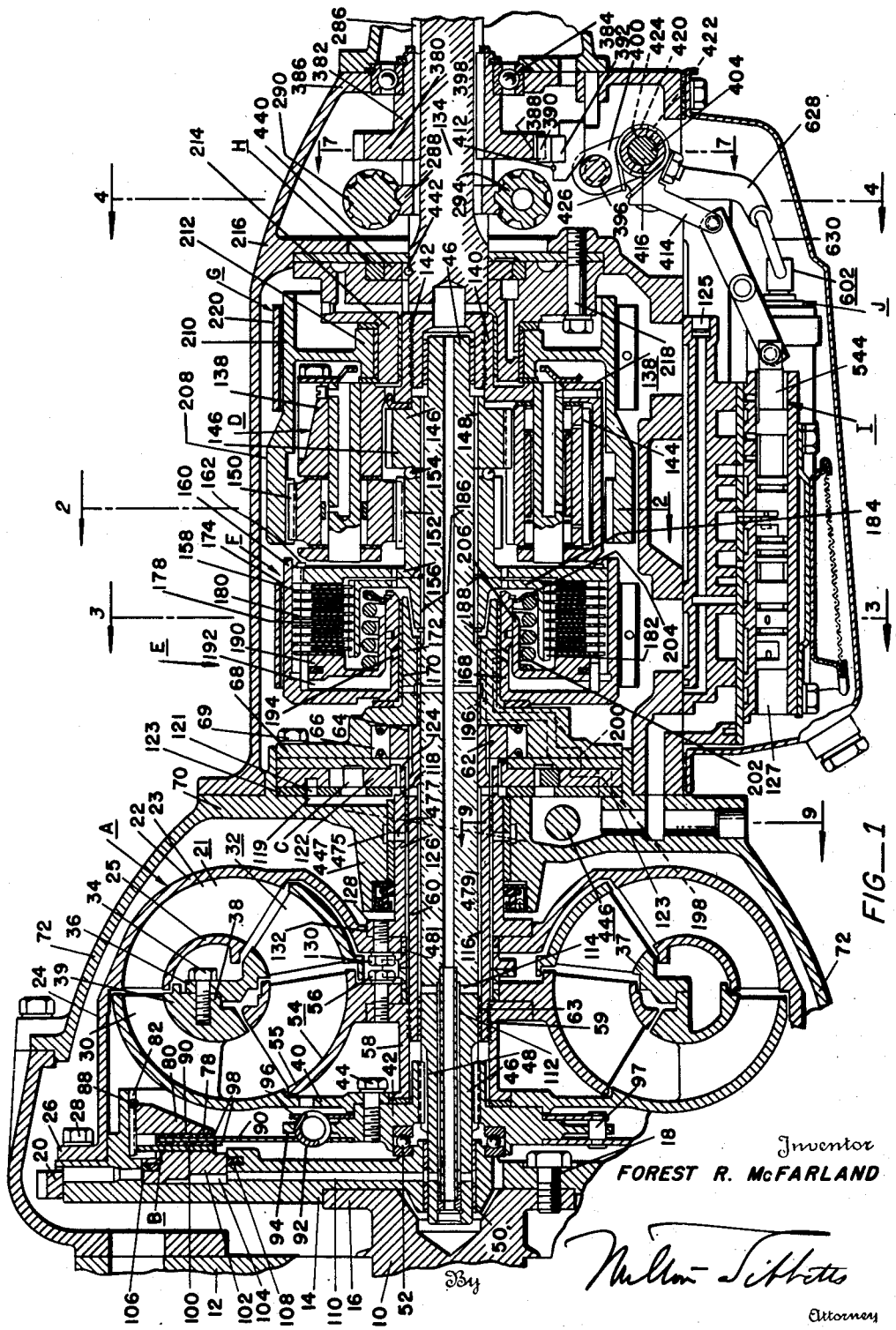
FIG_1
Inventor
FOREST R. McFARLAND
By Milton Tibbetts
Attorney Sept. 14, 1954     F. R. McFARLAND     2,689,029
TRANSMISSION
Original Filed Jan. 15, 1949     6 Sheets-Sheet 2
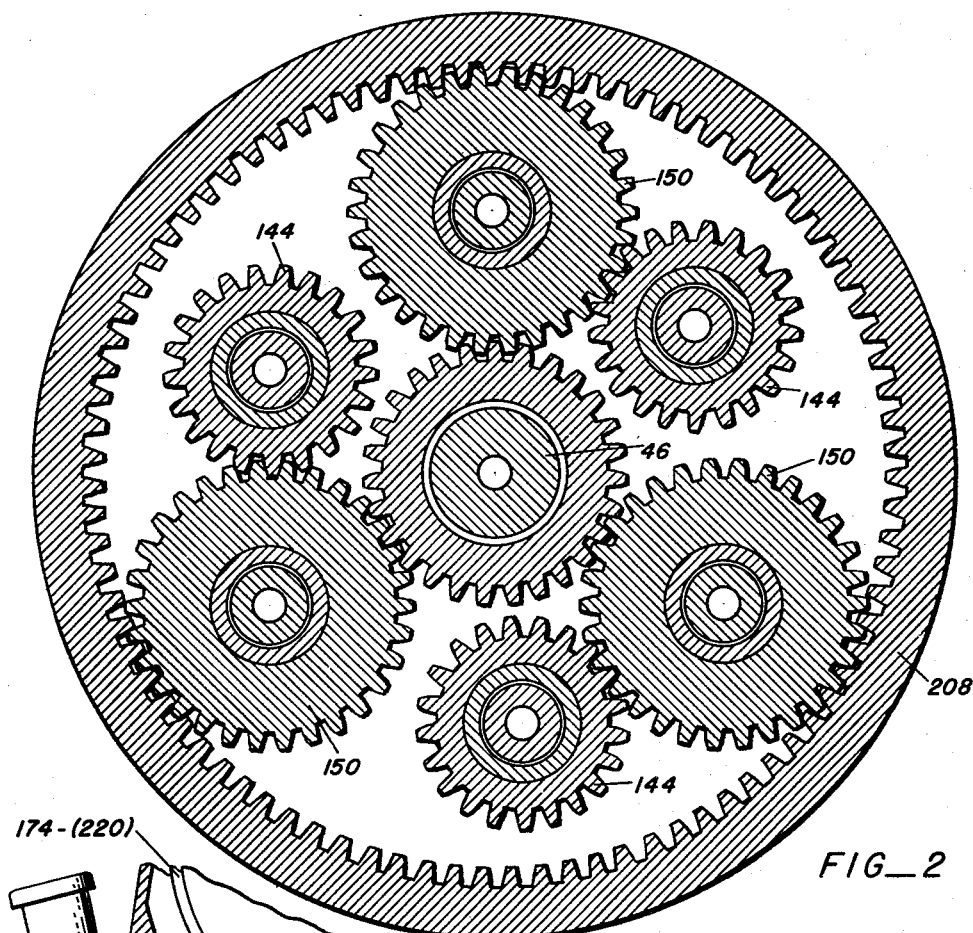
FIG_2
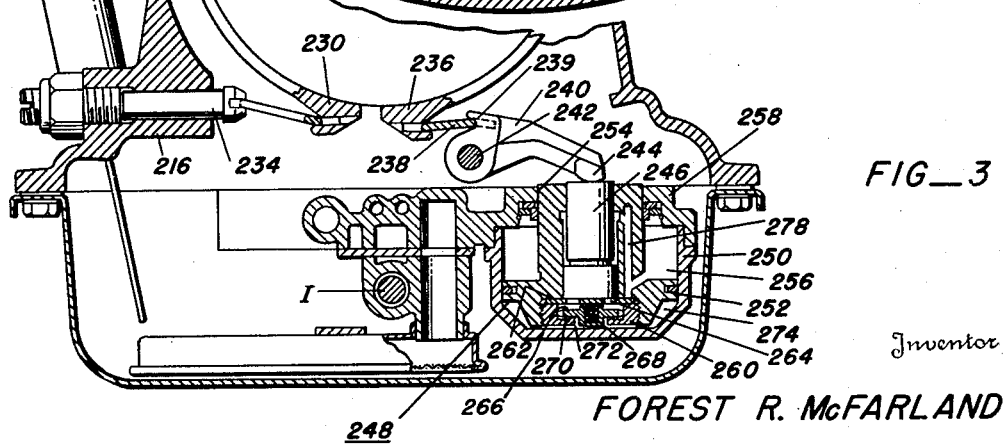
FIG_3
Inventor
FOREST R. McFARLAND Sept. 14, 1954    F. R. McFARLAND    2,689,029
TRANSMISSION
Original Filed Jan. 15, 1949                 6 Sheets-Sheet 3
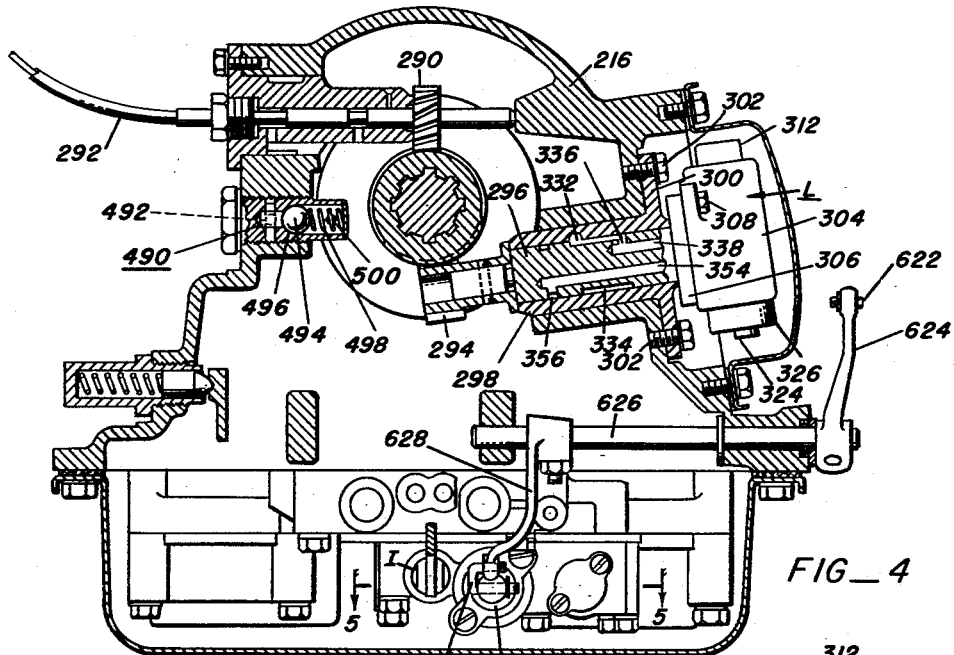
FIG_4
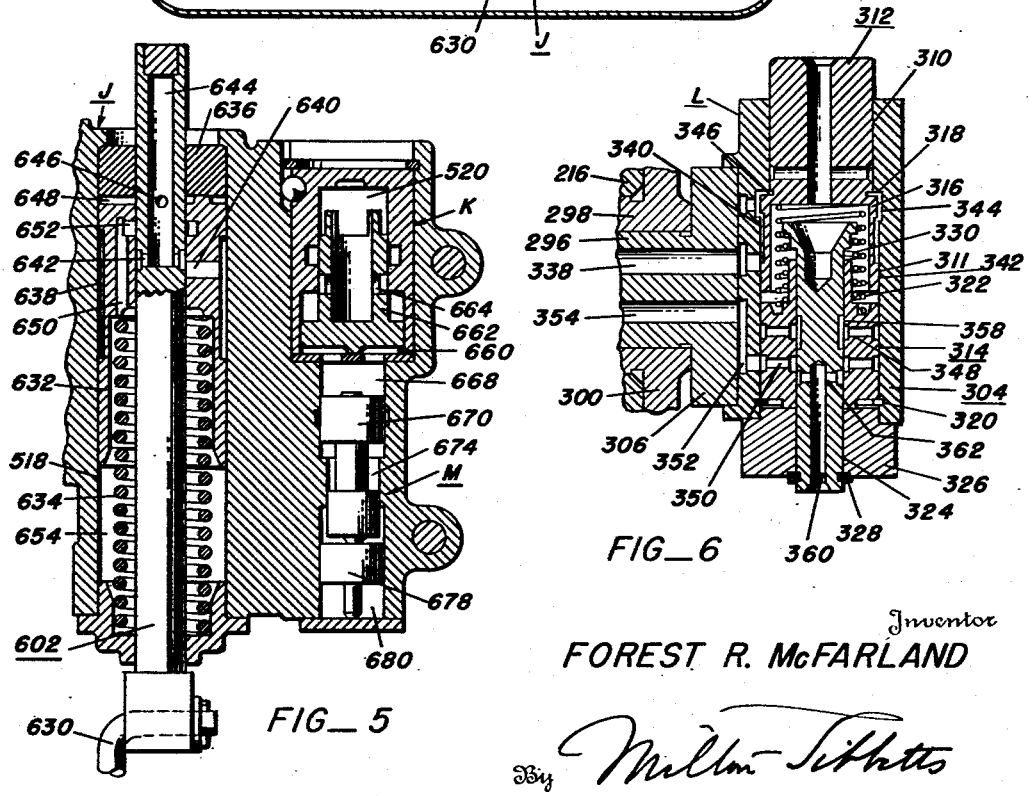
FIG_5    FIG_6
Inventor
FOREST R. McFARLAND
By Milton Tibbitts
Attorney Sept. 14, 1954     F. R. McFARLAND     2,689,029
TRANSMISSION
Original Filed Jan. 15, 1949     6 Sheets-Sheet 4
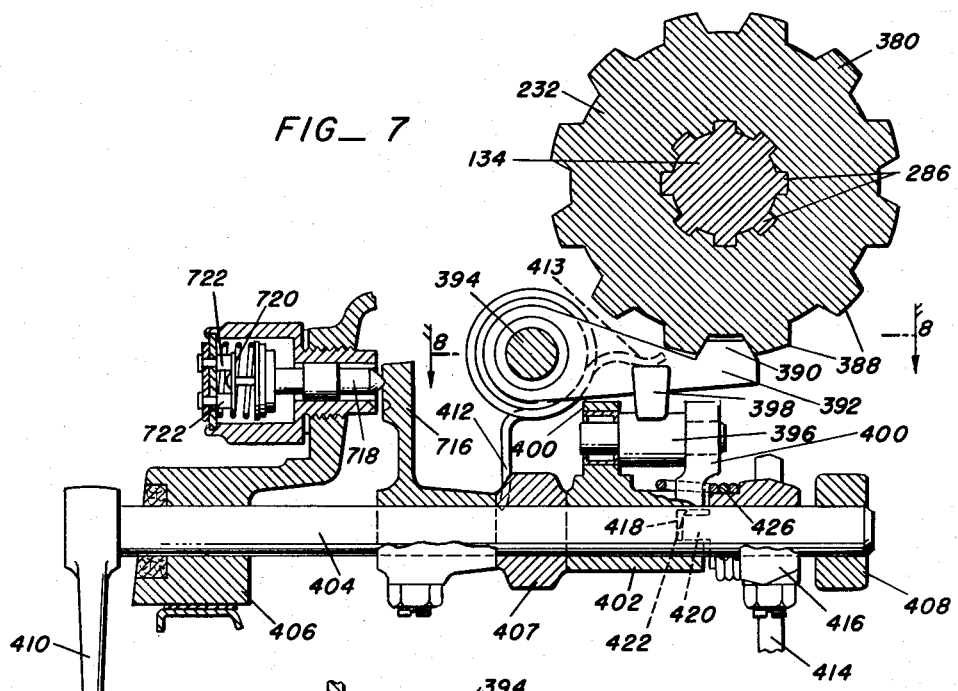
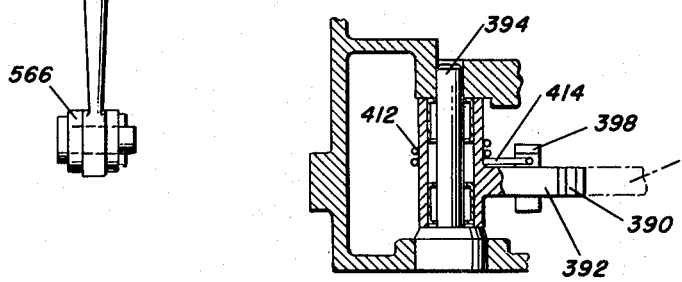
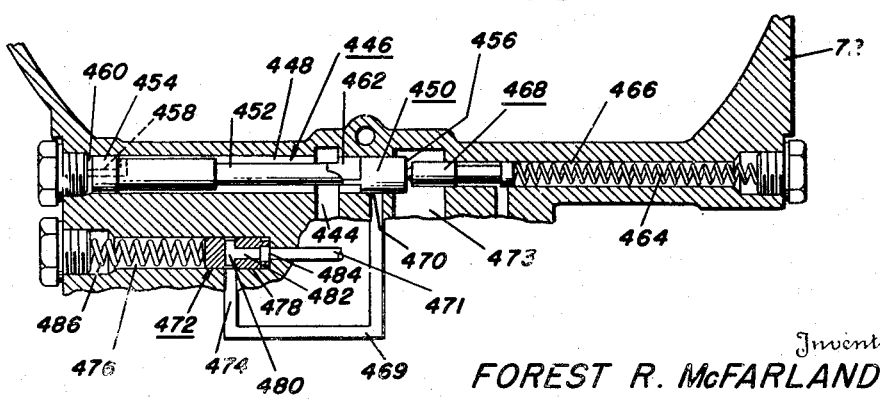
Inventor
FOREST R. McFARLAND

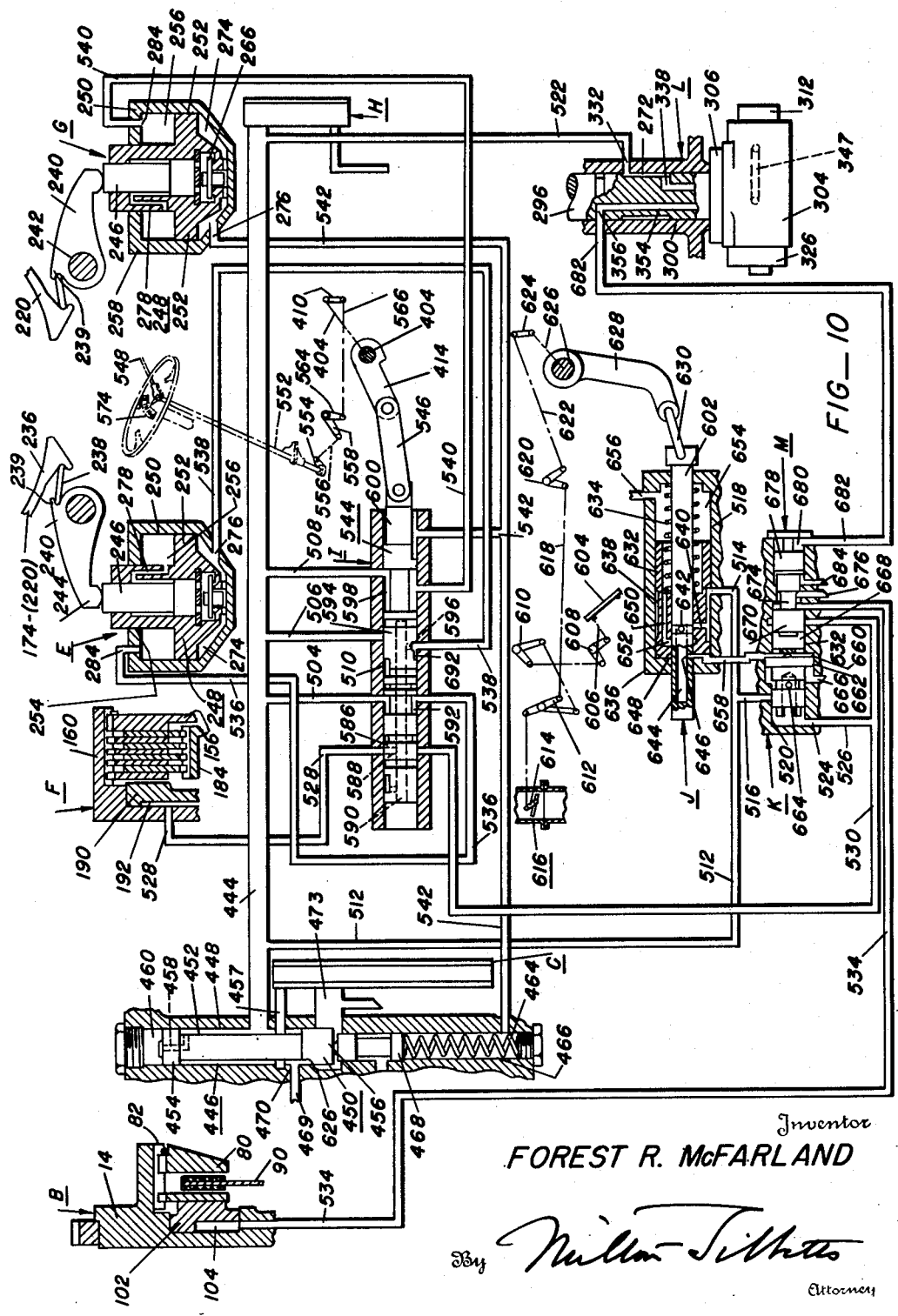

Sept. 14, 1954  F. R. McFARLAND  2,689,029
TRANSMISSION
Original Filed Jan. 15, 1949  6 Sheets-Sheet 6
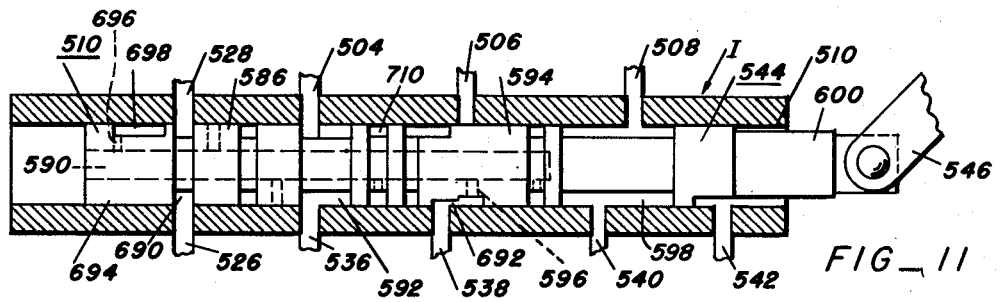
FIG_11
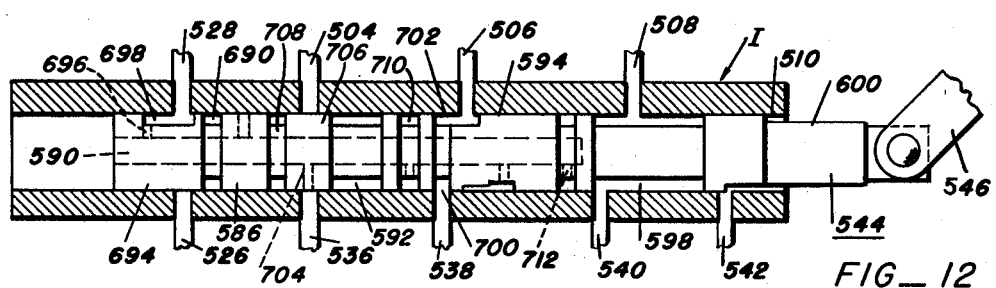
FIG_12
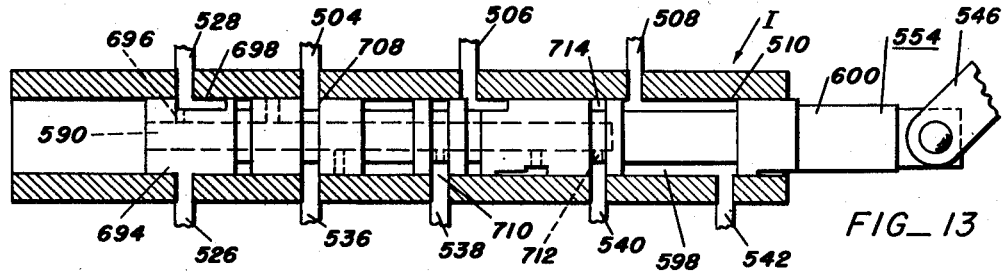
FIG_13
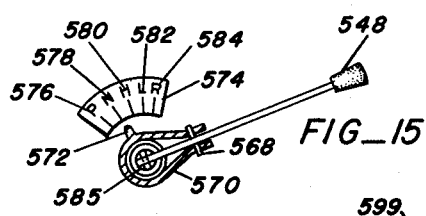
FIG_15
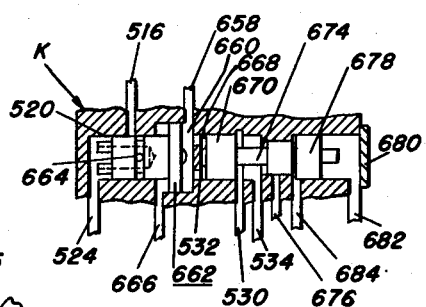
FIG_14   FIG_16
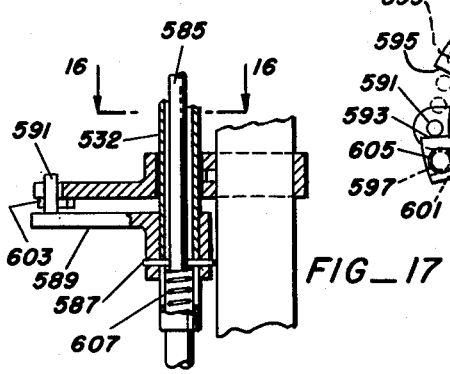
FIG_17
Inventor
FOREST R. McFARLAND Patented Sept. 14, 1954

2,689,029

UNITED STATES PATENT OFFICE 2,689,029

TRANSMISSION

Forest R. McFarland, Huntington Woods, Mich., assignor to Packard Motor Car Company, Detroit, Mich., a corporation of Michigan Original application January 15, 1949, Serial No. 71,128. Divided and this application July 1, 1950, Serial No. 171,690

24 Claims. (Cl. 192—.075)

This invention relates to transmissions for motor vehicles, and more particularly to an improved motor and clutch control to be used with a transmission having a torque converter and gearing controlled in such a manner as to insure desirable torque and speed ratio drives for varying conditions of operation.

This application is a division of my co-pending application Serial Number 71,128, for Transmission, filed January 15, 1949.

In the operation of motor vehicles, it is desirable that high torque be available for starting the vehicle from a standstill and for acceleration whenever needed. It is also desirable that the speed at which the engine is driven be maintained as low as conveniently possible consistent with providing sufficient power for driving the vehicle and for acceleration whereby to reduce wear and engine roar when the vehicle is travelling at higher speed, such for example as above fifty miles per hour.

An object of this invention is therefore to provide a transmission having torque converter and gear units, combined with a direct drive clutch, wherein means responsive to vehicle operating conditions are provided to deliver high torque when needed for starting and accelerating the vehicle, and a direct mechanical drive is provided for driving the vehicle at higher speeds.

A further object of the invention resides in the provision of an improved vehicle transmission adapted to provide high starting torque through torque converter and planetary gear units, and wherein means under the control of the driver are provided to selectively interrupt the torque increasing function of either or both the torque converter or the planetary gear unit to increase the speed ratio of the drive, or to provide a direct mechanical drive from the engine to the final driven shaft.

Still a further object is to provide a simplified and improved control mechanism wherein clutch engaging fluid pressure proportionate to the speed increasing position of the accelerator pedal is provided to engage spaced clutches controlling speed ratio changing mechanism.

Another object of the invention resides in the provision of an improved drive for a vehicle wherein a torque converter driven by a power shaft may be selectively connected to a final driven shaft through torque increasing or direct drive gearing, and a mechanical clutch in parallel with the torque converter may be engaged by means responsive jointly to vehicle speed and the speed increasing position of the accelerator pedal to render the torque converter inoperable, means being provided to permit the driver to reengage the torque converter to provide maximum power for acceleration whenever needed.

Another object of this invention is to provide a control for an engine and a clutch driven by the engine and operated by fluid pressure wherein the fluid pressure for operating the clutch varies in accordance with the position of the engine power control, and the operation of the clutch is controlled jointly by the position of the engine control and the speed of the output member of the clutch.

A more specific object resides in the provision of fluid pressure means, controlled jointly by the aforesaid position of the engine control and the speed of the output member of the clutch to control the operation of the clutch, the said fluid pressure means including a plunger type valve urged in one direction by fluid pressure proportionate to engine power control position and in the opposite direction by fluid pressure proportionate to the speed of rotation of the clutch output member.

Other objects and advantages of this invention will appear in the following detailed description and appended claims, reference being had to the accompanying drawings forming a part of this specification, wherein like reference characters refer to corresponding parts throughout the several views.

Fig. 1 is a longitudinal sectional view of a transmission mechanism embodying my invention.

Figs. 2 to 4 are sectional views taken substantially on the lines 2—2, 3—3, and 4—4 of Fig. 1, looking in the direction of the arrows.

Fig. 5 is a sectional view taken substantially on the line 5—5 of Fig. 4, looking in the direction of the arrows.

Fig. 6 is an enlarged sectional view of the governor illustrated in Fig. 4.

Fig. 7 is a sectional view taken substantially on the line 7—7 of Fig. 1, looking in the direction of the arrows.

Fig. 8 is a sectional view taken substantially on the line 8—8 of Fig. 7, looking in the direction of the arrows.

Fig. 9 is a sectional view taken substantially on the line 9—9 of Fig. 1, looking in the direction of the arrows.

Fig. 10 is a schematic view illustrating the controls for actuating the various elements of the transmission illustrated in Fig. 1.

Fig. 11 is a fragmentary view of a portion of Fig. 10 illustrating the position of certain of the control elements in the high range converter position.

Fig. 12 is a view similar to Fig. 11 illustrating the position of certain of the control elements in the low range converter position.

Fig. 13 is also a view similar to Fig. 11 illustrating the position of certain of the control elements in the reverse drive position.

Fig. 14 is a schematic view illustrating the direct drive shift valve in the actuated position.

Fig. 15 is a plan view of the selector lever.

Fig. 16 is a sectional view taken substantially on the line 16—16 of Fig. 17, looking in the direction of the arrows.

Fig. 17 is a side elevation of the lockout sector with parts broken away and parts in section.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to Fig. 1 it will be noted that an engine crankshaft or driving shaft 10 is journalled in an engine case or block 12. A flywheel 14 in the form of a disk is secured to a flange 16 carried by the driving member 10 as by screws 18. A starter gear 20 is secured to the outer periphery of the flywheel 14 in any suitable manner to permit cranking the engine.

A torque converter A is provided with a fluid energizing impeller 21, having an outer shell 22 including fluid deflecting vanes 23 interposed between the shell and an inner shroud 25. The outer shell 22 is provided with a cylindrical extension 24 terminating in a flange 26 adapted to be secured to the flywheel 14 as by screws 28. An energy absorbing turbine is associated with the impeller 21 and is provided with a first stage section 30 having an inlet adapted to be positioned adjacent the outlet from the impeller 21, and a second stage 32 adapted to be positioned adjacent the inlet to the impeller. The first and second stage turbine members 30 and 32 may be secured together in any suitable manner as by screws 34 projecting through a flange 36 carried by the inner shroud 37 of the second stage turbine 32 and extending into a boss 38 carried by the inner shroud 39 of the first stage turbine 30. It will of course be understood that if desired the first and second stage turbine members may be formed integrally or may be secured together in any other convenient manner.

The first stage turbine 30 is preferably provided with an inwardly extending flange 40 adapted to be secured to a hub 42 as by means of screws 44. The hub 42 is secured to an intermediate shaft 46 in any convenient manner as by splines 48. The intermediate shaft 46 is axially aligned with the driving member 10, and is journalled for rotation in the flywheel 14 secured to the driving member 10 through bushings 50, a thrust bearing 52 being interposed between the hub 42 and the flywheel 14.

The torque converter A is provided with a reaction member 54 preferably interposed between the first and second stage turbine members 30 and 32. The outer shell 55 of the reaction member is secured as by screws 56 to the flange of a hub 58 which in turn is secured as by welding 59 to a sleeve 60 the forward end of which is centrally positioned on the intermediate shaft 46 as by the bearing 63. A hub 62 secured to the rear end of the sleeve 60 as by splines 64 is connected to the stationary member 68 by a one-way brake 66 engaging the stationary member 68. The stationary member 68 is secured as by screws 69 to the rear end 70 of a housing 72 surrounding the torque converter A as illustrated.

The reaction member 54 is restrained from rotating in the backward direction in the fluid circuit by the one-way brake 66 when backwardly directed forces are exerted thereon by the circulating fluid when the device is operating to transmit power with increased torque at reduced speed. The reaction member 54 and sleeve 60 rotate in the forward direction on the one-way brake 66 when the device is operating as a fluid coupling to transmit torque from the driving member 10 to the intermediate shaft 46 with no multiplication of torque.

A mechanical clutch B is employed to provide a drive in parallel with the torque converter A. The clutch B is interposed between the driving member 10 and the intermediate shaft 46 to, in effect, interconnect the impeller and turbine members thereby interrupting the operation of the torque converter A to transmit torque directly from the driving shaft 10 to the intermediate shaft 46 at a 1 to 1 speed ratio.

The mechanical clutch B includes a driving member 80 mounted through splines 82 in a cylindrical portion of the flywheel 14. The driving member 80 is restrained against rearward axial movement by a snap ring 88. The mechanical clutch B includes a disk 90 operably connected to the hub 42 through a resilient coupling such as a plurality of coiled springs 92 positioned in circumferentially extending slots formed between a flange 94 carried by the hub 42 and the disk 90, a disk 96 being secured to the disk 90 as by rivets 97, and having similarly disposed slots to balance the driving forces exerted on the springs 92.

The disk 90 may be provided with friction surfaces 98 adapted to be clutched to the driving member 80 and to an auxiliary driving disk 100 axially movable on the splines 82 of the cylindrical member 84. A ring type piston 102 slidably mounted in a cylinder 104 is provided to move the disk 100 rearwardly to engage the clutch B positioned in parallel with the torque converter A.

When the clutch B is engaged torque is transmitted directly from the driving member 10 to the intermediate shaft 46 thereby mechanically interconnecting the impeller and turbine members 21 and 30 and rendering the torque converter A inoperable except as a flywheel. Radially expanding seals 106 and 108 carried by the piston 102 and the flywheel 14 are provided to prevent the escape of hydraulic fluid from the clutch engaging cylinder 104.

Fluid may be transmitted to the cylinder 104 to actuate the piston 102 through passages 110 in the flywheel 14 communicating with a bore 112 in the intermediate shaft 46. The bore 112 communicates, through radial passages 114 in the intermediate shaft 46, with a passage 116 between the intermediate shaft 46 and the reaction member sleeve 60, which in turn communicates through radial passages 118 with a passage 119 in the housing 72 connected through an annular groove 121 in a pump plate 123, and then through a series of interconnected passages shown diagrammatically in Fig. 10 as including a selector valve I and a direct drive shaft valve M as hereinafter more fully described.

Fluid under pressure to actuate the various clutch and brake members hereinafter described may be supplied when the engine is running by a front fluid pump C having an impeller 122 operably connected through splines 124 with a sleeve 126 having a flange 128 connected as by screws 130 to an inwardly directed flange 132 of the impeller web 22.

The intermediate shaft 46 is operably connected to a final driven shaft 134 through a planetary gear train D having a carrier 138 including a hub 140 secured to the final driven shaft 134 in any convenient manner as by brazing or welding as illustrated at 142.

The planetary gear train D has a plurality of equally spaced long pinion gears 144 rotatably mounted in the carrier 138, and meshing with a driving sun gear 146 secured to the intermediate shaft 46 as by splines 148. The long pinion gears 144 mesh with and drive a plurality of equally spaced short pinion gears 150 journalled in the carrier 138 and meshing with a controlling sun gear 152 rotatably mounted with reference to the intermediate shaft 46.

The controlling sun gear 152 is of smaller diameter than the driving sun gear 146 secured to the intermediate shaft 46. A thrust bearing 154 may be interposed between the driving sun gear 146 and the controlling sun gear 152 to maintain the gears in desired axial alignment, and to facilitate rotation of the gears relative to each other.

The controlling sun gear 152 may be locked against rotation by a low range brake E to transmit power through the planetary gear train at reduced speed, accompanied by a corresponding increase in torque. The controlling sun gear 152 is provided with a radially extended flange 156 having its outer extremity splined to engage cooperating splines 158 in a drum 160, a snap ring 162 being provided to limit rearward axial movement of the flange 156 in the drum 160. The drum 160 is provided with a hub 168 rotatably mounted on a bushing 170 positioned on an axially extending portion 172 of the stationary member 68.

A brake band 174 is provided to engage the drum 160 to lock the controlling sun gear 152 against rotation. When the controlling sun gear is thus locked against rotation the intermediate shaft 46 and the driving sun gear 146 fixed thereto drive the long pinion gears 144 meshing with the short pinion gears 150 to rotate them around the stationary controlling sun gear 152 to drive the carrier 138 and final driven shaft 134 in the same direction as the intermediate shaft 46, but at reduced speed, accompanied by a corresponding increase in torque. The speed reduction and increase in torque are of course dependent upon the ratio of the diameter of the driving sun gear 146 to the controlling sun gear 152.

The controlling sun gear 152 may be clutched to the intermediate shaft 46 by a high range clutch F to rotate in unison with the intermediate shaft 46 and the driving sun gear 146 to lock up the planetary unit D to transmit power therethrough at a 1 to 1 speed ratio with no increase of torque. The high range clutch F is provided with a plurality of driving disks 178 having notched inner edges to engage splines 182 formed in a hub 184 secured to the intermediate shaft 46 as by splines 186. A plurality of driven disks 180 alternately spaced with reference to the driving disks 178 have notched outer surfaces to engage the splines 158 in the drum 160 splined to the flange 156 of the controlling sun gear 152. Snap rings 188 are provided on opposite sides of the hub 184 to prevent it from shifting axially in either direction on the intermediate shaft 46.

The clutch F may be engaged by fluid pressure exerted on a ring type piston 190 slidably mounted in a cylinder 192, fluid under pressure being supplied to the cylinder 192 through passages 194, 196, 198 and 200 from the control valve mechanism illustrated diagrammatically in Fig. 10 by line 528 interconnecting cylinder 192 with the cylinder of the selector valve I as hereinafter more fully described. A spring 202 interposed between an abutment 204 secured to the hub 168 and a hub portion 206 of the piston 190 may be employed to yieldingly urge the piston 190 to the clutch disengaging position.

The final driven shaft 134 may be rotated in the reverse direction by means of a reverse drive brake G. A ring gear 208 meshing with the short pinion gears 150 is provided with a drum 210 secured to a hub 212 rotatably mounted on a stationary member 214 secured to a housing 216 as by screws 218. The housing 216 surrounds the planetary gear unit D, and is secured in any convenient manner to the housing 72 surrounding the torque converter A. A brake band 220 is provided to lock the drum 210 and ring gear 208 against rotation whereupon the final driven shaft 134 is rotated in the reverse direction as power applied to the driving sun gear 146 rotates the long pinion gears 144 to roll the short pinion gears 150 backwardly in the ring gear 208 to drive the carrier 138 and final driven shaft 134 in the reverse direction.

To insure best results I have devised an improved actuator for the low range brake E and for the reverse drive brake G. Both actuator mechanisms are identical, hence only one will be described. Referring now to Figs. 3 and 10 it will be noted that one end 230 of the brake band 174 (or 220) is anchored on an adjustable stud 234 secured in the housing 216. The other end 236 of the band 174 (or 220) may be actuated by a link 238 engaged by an arm 239 of a bellcrank lever 240 mounted on a shaft 242, and having an arm 244 adapted to be actuated by a small piston 246.

To insure rapid and positive engagement of the brakes, I employ a small piston to take up the slack in the linkage and move the band 174 (or 220) into contact with the drum, and a large piston to move the band into braking engagement with the drum.

The small piston 246 is slidably mounted in a larger piston 248 mounted for reciprocation in a cylinder 250. The larger piston 248 has a section 252 of large diameter adapted to engage the walls of the cylinder 250, and a section 254 of smaller diameter adapted to provide an annular brake releasing chamber 256 between the top of the section 252 of larger diameter and a closure 258 for the cylinder 250. A plug 260 is threaded in the bottom of the large piston 248, a washer 262 having a plurality of apertures 264 being provided to form a seat for the small piston 246. A disk type valve 266 is interposed between the bottom of the plug and the washer 262, and is yieldingly urged by a spring 268 to seat against a circumferentially extending shoulder 270 formed in the plug 260, an annular passageway 272 interconnecting the space within the plug 260 with an actuating chamber 274 beneath the section of large diameter 252 of the piston 248 and the cylinder 250.

As illustrated in Fig. 10, a passageway 276 communicates with the actuating chamber 274 to subject the space beneath the section of large diameter 252 of the piston 248 to fluid pressure to move the brake band 174 or 220 into braking engagement with its associated drum. Referring again to Fig. 3, fluid under pressure flows through the annular passageway 272 and urges the disk type valve 266 upwardly compressing the spring 268. Fluid then flows around the valve 266 and through the apertures 264 to urge the small piston 246 upwardly thereby actuating the lever 240 to take up slack and engage the band 174 or 220 with its associated drum. The small piston 246 moves rapidly as fluid under pressure flows into the large diameter actuating chamber 274 to rapidly engage the band with the drum. The small piston 246 does not exert sufficient force through the linkage to lock its associated drum against rotation when it is subjected to load, and will therefore be restrained against further movement when the slack in the linkage has been taken up and the band 174 or 220 is engaged with the drum.

As fluid under pressure continues to flow into the actuating chamber 274, beneath the section 252 of large diameter, the large piston 248 is urged upwardly in the cylinder 250. As pressure equalizes on opposite sides of the disk valve 266 the spring 268 urges the valve 266 downwardly against the shoulder 270 thereby trapping a column of oil between the disk valve 266 and the small diameter piston 246. Pressure exerted in the chamber 274 beneath the large diameter section 252 forces the large piston 248 upwardly to clamp the brake band 174 or 220 to its associated drum with a sufficient force to lock the drum against rotation.

The brake applying force is transmitted through the column of oil trapped between the disk valve 266 and the small piston 246. This fluid gradually leaks out through the passage 278 illustrated in Figs. 3 and 10 into the annular brake releasing chamber 256. When all of the trapped fluid has escaped the small piston 246 seats against the washer 262 whereupon a mechanical connection is established between the lever 240 and the large piston 248. As the trapped fluid escapes, the piston 248 rises in the cylinder 250 to maintain brake band 174 or 220 in locking engagement with its associated drum.

As shown in Fig. 10 fluid flows from the annular brake releasing chamber 256 through a passageway 284 communicating with a restricted outlet passage in the control mechanism as hereinafter more fully described to control the rate of movement of the large piston 248 to control the rate of engagement of the band 174 or 220 with the associated drum.

Referring now to Fig. 1 it will be noted that the final driven shaft 134 is provided with splines 286 to receive a gear 288. As illustrated in Fig. 4 the gear 288 drives a gear 290 connected to drive a speedometer through a flexible connector 292. The gear 288 also drives a gear 294 of a governor L.

The gear 294 of the governor L is secured to a rotatable member 296 journalled in a casing 298 having a flange 300 secured to the housing 216 as by screws 302. A member 304 is secured to a flange 306 of the rotatable member 296 as by screws 308. As illustrated in Fig. 6, the member 304 has a compound bore 310 and 311 extending at right angles to the axis of the rotatable member 296. A pair of spaced members 312 and 314 are received within the bores 310 and 311 respectively of the member 304, the member 312 having a step 316 movable toward a shoulder 318 formed between the sections of the bores 310 and 311. A snap ring 320 positioned in a groove in the bore 311 is provided to limit outward movement of the member 314 in the bore 311, a spring 322 interposed between the members 312 and 314 being provided to urge them outwardly in opposite directions. A plunger 324 is slidably mounted in the member 314 for radial movement perpendicular to the axis of the rotatable member 296. A weight 326 secured to the plunger 324 as by means of a snap ring 328 urges the plunger 324 outwardly relative to the member 314 when subjected to centrifugal force by rotation of the member 296 a spring 330 interposed between the member 314 and the inner end of the plunger 324 is provided to urge the plunger 324 and weight 326 inwardly.

The casing 298 surrounding the rotatable member 296 is provided with a fluid inlet port 332 communicating with the fluid pressure gallery as hereinafter more fully described in connection with Fig. 10. The port 332 communicates through interconnected inlet passages 334, 336 and 338 with an axial groove 340 (Fig. 6) formed in the section 342 of larger diameter of the member 312 mounted in the bore 311. The axial groove 340 communicates under certain conditions of operation with an internal groove 344 formed in the bore 311 adjacent the shoulder 318 at the juncture between the bores 310 and 311 in the member 304. The member 312 is urged radially outwardly in the compound bores 310 and 311 to increase communication between the axial groove 340 and the internal groove 344 as centrifugal force exerted on the member 312 and the force exerted by the spring 322 urges the member 310 outwardly.

Outward movement of the member 312 is opposed by fluid pressure exerted in an annular chamber 346 interposed between the shoulder 318 at the juncture between the bores 310 and 311, and the step 316 between the sections of different diameters of the member 312. Fluid pressure exerted in the chamber 346 urges the member 312 inwardly to reduce communication between the axial groove 340 in the member 312 and the internal groove 344 in the member 304 thereby reducing the quantity of fluid admitted to the chamber 346, and controlling the pressure of the fluid therein. The effective piston area of the chamber 346 is such as to give a pressure equal to a constant, proportional to the load of spring 322 plus a value proportional to the square of the rotational speed of the shaft 296, which results in a value which, in general, is substantially proportional to the speed of the vehicle.

The chamber 346 and the internal groove 344 are connected by a passageway 347 (Fig. 10) with a radial port 348 in the member 314. The member 314 also has another radial outlet port 350 spaced outwardly from the port 348, and communicating with interconnected outlet ports 352, 354 and 356 in the rotatable member 296 connected with a direct drive shift valve as hereinafter described. The plunger 324 slidably mounted in the member 314 has an axial groove 358 proportioned to interconnect the radial ports 348 and 350 in the member 314 when the plunger 324 has moved outwardly in the member 314 under the influence of centrifugal force developed by a vehicle speed of approximately thirteen miles per hour. The plunger 324 has vent passages in the form of intersecting longitudinal and cross bores 360 and 362 adapted to communicate with the radial outlet port 350 in the member 314 when the device is in the position of rest illustrated in Fig. 6.

As illustrated in Figs. 1, 7 and 8, the final driven shaft 134 is provided with a parking gear 380 having a hub 382 engaging the splines 286 in the final driven shaft 134, the hub 382 being journalled in a bearing 384 mounted in the rear closure 386 of the housing 216. The parking gear 380 is provided with teeth 388 adapted to be engaged by a sprag 390 carried by a lever 392 journalled on a shaft 394.

The lever 392 may be actuated to engage the sprag 390 with the teeth 388 by means of a roller 396 adapted to engage a cam member 398 secured to the lever 392. The roller 396 is journalled in spaced arms 400 carried by a hub 402 rotatably mounted on a shaft 404. The shaft 404 is journalled in bosses 406, 407, and 408 in the housing 216, and has a lever 410 secured thereto and adapted to be actuated by a manually operated selector lever as hereinafter more fully described. A spring 412 having one of its ends secured in the boss 407 encircles the shaft 394, and has its other end 413 bearing against the upper surface of the cam 398 to yieldingly urge the sprag 390 carried by the lever 392 away from the teeth 388 of the parking gear 380.

As illustrated in Figs. 1 and 7, a lever 414 to actuate the movable plunger of a selector valve mechanism I, illustrated in Fig. 10, is fixed to the shaft 404 through a hub 416. One end of the parking brake actuating hub 402 is slotted transversely as illustrated at 418 to receive the flattened end projection 420 of the selector valve actuating hub 416. The slotted end 418 of the hub 402 provides angularly related surfaces 422 and 424 as more clearly illustrated in Fig. 1 to permit limited rotational movement of the selector valve actuating hub 416 and shaft 404 without rotating the parking brake actuating hub 402. A spring 426 interposed between one of the parking brake actuating arms 400 and the hub 416 secured to the shaft 404 is provided to rotate the parking brake actuating hub 402 with the hub 416 and shaft 404. When the sprag 390 engages one of the teeth 388 of the parking gear 380 and is thus prevented from moving to the engaging position, the spring 426 winds up to permit the shaft 404 and hub 416 to move to the end of its cycle of operation, and exerts a yielding force urging the sprag 390 toward engagement with the parking gear 380. When the parking gear 380 rotates slightly the spring 426 overcomes the force exerted by the lightly loaded spring 412 and urges the sprag 390 into engagement with the teeth 388 to lock the final driven shaft 134 against rotation. As the sprag actuating mechanism is moved to release the parking device the angularly related surfaces 422 of the hub 416 engage the angularly related surfaces 424 of the hub 402 and forcibly rotates the hub 402 and arms 400 to move the roller 396 out of engagement with the cam 398. The sprag 390 is then withdrawn from the gear 380 by the camming action of the teeth 388 and by the spring 412.

Referring now more particularly to Figs. 1 and 10 it will be noted that the clutches B and F and the brakes E and G are actuated by fluid pressure supplied by the front pump C, and by a rear pump H having an impeller 440 secured to the final driven shaft 134 in any convenient manner as by a plurality of driving balls 442.

The outlet passages from the front and rear pumps C and H communicate with a common fluid pressure supply gallery 444 having a single pressure relief valve 446 illustrated in Figs. 9 and 10 preferably mounted forwardly of the front pump C beneath the intermediate shaft 46 as illustrated in Fig. 1. The relief valve 446 may be set to maintain any desired pressure, such for example as eighty pounds per square inch in the gallery 444.

The relief valve 446 comprises a compound cylinder having a large diameter section 448 communicating with the supply gallery 444. A plunger 450 is slidably mounted in the large diameter cylinder 448 and has a portion 452 of reduced diameter interposed between spaced larger diameter sections 454 and 456.

A spring 464 positioned in a cylinder 466 of smaller diameter and engaging the end of a plunger 468 contacting the plunger 450 is provided to urge the plunger 450 away from the venting position. When the engine is not running, the spring 464, urges the plungers 468 and 450 toward the end of the cylinder defining the chamber 460, whereupon the section of large diameter 456 closes off a port 470 communicating with the torque converter A through a conduit 469 connected with the torque converter A through a pressure regulating valve 472 illustrated in Fig. 9 and a conduit 471 communicating with interconnected passages as hereinafter described.

A restricted passageway 458 in the large diameter section 454 of the plunger 450 is provided to admit fluid from the cylinder 448 to a chamber 460 in the outer end of the cylinder remote from the spring 464. Fluid pressure proportionate to the pressure exerted in the gallery 444 is thus exerted on the end of the plunger 450 to urge it toward an inlet port 473 of the front pump C to maintain a substantially predetermined fluid pressure.

The pressure regulating valve 472 has an inlet port 474 communicating with the port 470 of the pressure regulating valve 446 through a conduit 469. The port 474 communicates with a cylinder 476 having a plunger 478 slidably mounted therein. The plunger 478 has a cross bore 480 communicating with a longitudinal bore 482 aligned with a port 484 connected with the interior of the torque converter A through the passage 471, and an annular groove 475 illustrated in Fig. 1 communicating with radial ports 477 in the sleeve 126 connected with the interior of the torque converter A through an annular space 479 between the sleeves 60 and 126, and radially disposed apertures 481.

The plunger 478 of the regulating valve 472 is yieldingly urged by a spring 486 in the cylinder 476 to align the cross bore 480 with the inlet port 474. The plunger 478 is urged in the opposite direction to reduce communication between the port 474 and the cross bore 480 by fluid pressure exerted on the end of the plunger remote from the spring 486. The torque converter A may thus be supplied with fluid under any desired pressure, such for example as thirty pounds per square inch by merely varying the tension of the spring 486.

If desired a pressure relief valve may be employed to permit the escape of fluid from the torque converter when the valve is subjected to predetermined pressure. As illustrated in Fig.

4 a check valve 490 communicating through a passage 492 with the space within the torque converter A has a ball check 494 pressed against a seat 496 by a spring 498 to permit the escape of fluid from the torque converter when the pressure transmitted through the passage 492 and exerted on the ball check 494 is sufficient to overcome the resistance of the spring 498, such for example as twenty pounds per square inch. The escaping fluid flows through a port 500 and flows to the sump.

It will be apparent that if desired heated fluid may be withdrawn from the torque converter A through the check valve 490 and passed through a radiator to cool it, and that cooled liquid may be supplied to the circuit of the torque converter through the pressure regulating valve 472. Circulation may be insured by setting the check valve 490 to discharge fluid at a lower pressure than fluid admitted to the torque converter by the regulating valve 472 as indicated above.

Referring now to Fig. 10 it will be noted that the fluid pressure supply gallery 444 is provided with a plurality of spaced conduits 504, 506 and 508 communicating with a cylinder 510 of the selector valve I. The pressure supply gallery 444 also has a conduit 512 communicating through branch conduits 514 and 516 respectively with the cylinder 518 of a throttle governing valve J, and with a cylinder 520 of a clutch modulating valve K. The pressure gallery 444 also has a conduit 522 communicating with the inlet port 332 of the governor L driven by the final driven shaft 134.

The cylinder 520 of the clutch modulating valve K has an outlet port 524 communicating through conduits 526 and 530 with the cylinder 510 of the selector valve I near its forward end. Another conduit 528 communicating with the cylinder 510 of the selector valve I in alignment with the conduit 526 communicates with the cylinder 192 to actuate the ring type piston 190 to engage the high range clutch F of the planetary gearing D. The conduit 526 connected with the cylinder 520 of the clutch modulating valve K is connected through a branch of conduit 530 with the cylinder 532 of a direct drive shift valve M having another conduit 534 communicating with the cylinder 104 of the mechanical clutch B to actuate the ring type piston 102 to engage the clutch thereby rendering the torque converter A inoperable except as a flywheel.

The cylinder 510 of the selector valve I has a conduit 536 in alignment with the conduit 504 from the fluid pressure gallery 444. The conduit 536 connects with the passage 284 of the release cylinder 250 of the low range brake E. The cylinder 510 of the selector valve I has a conduit 538 spaced forwardly of the conduit 506 and extending through the port 276 of the actuating chamber 274 of the low range brake E. The cylinder 510 of the selector valve I also has spaced conduits 540 and 542 spaced forwardly and rearwardly of the conduit 508 and communicating respectively with the releasing and actuating chambers 250 and 274 of the reverse drive brake G.

As illustrated in Fig. 10, the selector valve I has a plunger 544 adapted to be actuated by a link 546 connected to the lever 414 operated by the lever 410 and shaft 404 by the manually actuated shifter lever hereinafter described. The plunger 544 has a series of annular grooves and lands adapted to direct fluid pressure from the pressure supply gallery 444 to actuate the various clutch and brake members to drive the vehicle in accordance with the position of a selector lever 548 mounted on a steering column 550.

The selector lever 548 is connected through a tube 552 with a lever 554, which in turn is connected through a rod 556 with an arm 558 of a bell crank mounted on the frame of the vehicle. The other arm 564 of the bell crank is connected through a rod 566 with the lever 410 secured to the shaft 404 operably connected to the plunger 544 of the selector valve I through the lever 414 and the link 546.

As illustrated in Fig. 15 the selector lever 548 is pivoted at 568 to a housing 570 having a pointer 572 adapted to move over a scale quadrant 574 having reference characters thereon indicating positions of park, neutral, high, low and reverse 576, 578, 580, 582 and 584 respectively.

The inner end of the selector lever 548 is hingedly secured to a rod 585, at the bottom end of which is secured a pin 587, engaging a lever 589, having a pin 591 movable between stops 593 and 595 when the outer end of the lever 548 is in its downward position. When the outer end of the lever 548 is elevated, the lever 589 and pin 591 are moved downwardly because of the fulcruming of the lever 548 about the pin 568. Pin 591 is then displaced beneath stops 593 and 595, and is free to move to positions 597 and 599 whereupon the pin 591 abuts against auxiliary stops 601 and 603 respectively. This arrangement permits shifting the lever 548 to engage the neutral, high and low positions, indicated by 578, 580 and 582 on a lower level, and provides adequate stops to prevent unintentional shifting into the park and reverse positions 576 and 584 respectively positioned at opposite ends of the quadrant 574.

When the lever 548 is shifted into the park position 576, its motion through the linkage 552, 556, 558, 564, 566, 410, 404, to lever 414 causes tension to be applied through the linkage which would ordinarily induce lever 589 to move away from stop position 601. To avoid this occurrence a hole 605 is located adjacent stop 601, to receive the pin 591 thereby locking the lever 589 from moving toward the neutral position from the park position because of the force exerted by the spring 426 in the transmission as previously described.

This lock is required only in the park position, and detents are employed to hold the mechanism in the neutral, high, low and reverse positions. A spring 607 (Fig. 17) urges the rod 585 upwardly to maintain the pin 591 in an upward position between the stops 593 and 595, and in hole 605.

Fig. 10 illustrates the position of the plunger 544 of the selector valve I when the selector lever 548 is in either the park position 576 or the neutral position 578.

It will be noted that the plunger 544 has a land 586 adapted to cut off the flow of fluid through the conduit 526 communicating with the cylinder 520 of the clutch modulating valve K, and that a port 588 through the land 586 connects the conduit 528 with a central vent passage 590 in the plunger 544 to vent the high range clutch F.

The plunger 544 has an annular groove 592 adapted to interconnect the conduit 504 with the conduit 536 connected with the release chamber 250 of the low range brake E to exert pressure on the piston 248 to disengage the low range brake. The plunger 544 has a land 594 adapted to close off the flow of fluid from the pressure gallery 444 through the conduit 506, and a port 596 to connect the central vent passage 590 with the conduit 538 communicating with the actuating chamber 274 of the low range brake E.

The plunger 544 also has an axially extended annular groove 598 adapted to interconnect the conduit 508 from the pressure gallery 444 with the conduit 540 leading to the release chamber 250 of the reverse drive brake G. The conduit 542 communicating with the actuating chamber 274 of the reverse drive brake G is vented between a reduced diameter portion 600 at the rear end of the plunger 544 and the cylinder 510.

It will be noted that in the neutral and park positions illustrated in Fig. 10 the actuating cylinders 104 and 192 of the clutches B and F are vented. The actuating cylinders 274 of the low range brake E and the reverse drive brake G are vented, and the releasing chambers 256 of the low range and the reverse drive brakes E and G are subjected to fluid pressure to insure positive disengagement of the brakes.

As illustrated in Figs. 5 and 10 the throttle governing valve J has a plunger 602 slidably mounted in the cylinder 518 and actuated to move rearwardly therein in response to speed increasing movement of an accelerator pedal 604. The accelerator pedal is connected through a rod 606 and a series of interconnected bell cranks 608, 610 and 612 to the throttle valve 614 of a carburetor 616. The bell crank 612 is connected through a rod 618 and a bell crank 620 to a rod 622 operably connected to a lever 624 secured to a shaft 626 having a lever 628 secured thereto and operably connected to the plunger 602 through a link 630 to shift the plunger rearwardly as the accelerator pedal 604 is moved in the throttle opening direction.

A movable sleeve 632 is interposed between the cylinder 518 and the plunger 602 and is yieldingly urged by a spring 634 toward a fixed abutment 636. The sleeve 632 has an elongated annular groove 638 communicating with the branch conduit 514 which receives fluid under pressure from the supply gallery 444 through the conduit 512. The sleeve 632 has a radial port 640 adapted to align under certain conditions of operation with a cross bar 642 in the plunger 602, and communicating with a longitudinal bore 644 in the plunger. The plunger 602 has another cross bore 646 positioned to admit fluid to a chamber 648 in the cylinder 518 forwardly of the sleeve 632.

As the accelerator pedal 604 is moved in the speed increasing direction, the plunger 602 moves rearwardly in the cylinder 518 thereby increasing communication between the radial port 640 in the sleeve 632 and the cross bore 642 in the plunger 602. Fluid under pressure from the gallery 444 then flows through the aligned passages to the chamber 648 thereby increasing the pressure exerted on the forward end of the sleeve 632. As increased pressure is exerted in the chamber 648 the sleeve 632 is shifted rearwardly against the resistance of the spring 634, thereby decreasing communication between the port 640 and the cross bore 642. The sleeve 632 shifts on the plunger 602 until a point of equilibrium is reached between the force exerted by the spring 634 urging it forwardly and the fluid pressure exerted in the chamber 648 urging it rearwardly.

As the plunger 602 is moved by actuation of the accelerator pedal 604, the sleeve 632 moves with it with substantially no time lag. The pressure exerted in the chamber 648 is thus substantially proportional to the position of the accelerator pedal 604.

The sleeve 632 of the throttle governor valve J is provided with an internal annular groove 652 open to atmosphere through ports 656. When the plunger 602 is moved forwardly from any rearward position by throttle closing movement of the accelerator pedal 604 or toward the engine idling position, fluid trapped in the chamber 648 can flow through the cross bore 646 in the plunger 602, thence axially in the longitudinal bore 644 and out cross bore 642 into the circumferential groove in the plunger 602 which lines up with the inner groove 652 in the sleeve 632. As the plunger 602 moves forwardly by throttle closing movement of the accelerator pedal 604, the chamber 648 is vented until the inner groove 652 of the sleeve 632 has aligned itself with the groove adjacent the cross bore 642 of the plunger 602 thereby cutting off the venting means. Further forward movement of the plunger 602 by continued movement of the accelerator pedal toward the engine idling position will provide further venting as described.

Movement of plunger 602 by throttle opening movement of the accelerator pedal 604 will again align the groove in the plunger 602 with the radial port 640 in the sleeve 632 thereby permitting the pressure from the gallery 444 to flow through the groove into chamber 648 thereby again aligning the ports in sleeve 632 and in the plunger 602 up to the point where pressure in the port 640 is cut off. By this means the sleeve 632 travels with the plunger 602, and at the same time maintains the throttle governor pressure in chamber 648 directly proportional to the speed increasing position of the accelerator pedal 604.

The chamber 648 communicates through a conduit 658 with a chamber 660 aligned with the cylinder 520 of the clutch modulating valve K, but of larger diameter than the cylinder 520. A plunger 662 slidably mounted in the cylinder 520 is thus subjected to increasing fluid pressure proportionate to the speed increasing position of the accelerator pedal 604.

The plunger 662 has a cross bore 664 adapted to communicate with a vent passage 666 or with the branch conduit 516 connected through the conduit 512 with the pressure gallery 444 when the plunger 662 is urged forwardly by throttle governed fluid pressure exerted on the rear face of the plunger 662. As fluid flows through the cross bore 664 its pressure is exerted in cylinder 520 against the front face of the plunger 662 to urge it rearwardly in opposition to the throttle governed pressure exerted in the larger diameter chamber 660. As the plunger moves rearwardly the communication between the branch conduit 516 and the cross bore 664 is reduced thereby decreasing the flow of fluid into the cylinder 520 forwardly of the plunger 662. The pressure exerted in the cylinder 520 forwardly of the plunger 662 and transmitted to the high range clutch F through the conduit 526 is thus modulated in proportion to the speed increasing position of the accelerator pedal 604. Thus the high range clutch F is engaged by fluid pressure proportionate to the speed increasing position of the accelerator pedal. For example with relatively small speed increasing movement of the accelerator pedal 604, the clutch engaging pressure exerted in the conduit 526 would be relatively low to engage the clutch slowly to provide a slow smooth start. With more rapid speed increasing position of the accelerator pedal, the clutch engaging pressure exerted in the conduit 526 would be higher to accommodate the increased torque exerted by the engine.

The chamber 660 communicates with a chamber 668 of small diameter in the forward end of the cylinder 532 of the direct drive shift valve M. A forward plunger 670 has its forward end subjected to throttle governed fluid pressure in the chamber 668 to urge the plunger rearwardly to close the conduit 530, and to vent the conduit 534 communicating with the mechanical clutch B through an annular groove 674 in the plunger 670 and a vent passage 676 in the cylinder 532. A rear plunger member 678 has its rear end subjected to fluid pressure in a chamber 680 communicating through a conduit 682 with the outlet port 356 of the governor L. A vent passage 684 is provided in the cylinder 532 to permit the escape of any fluid passing the rear section 678 of the plunger 670.

The plunger 670 is thus urged rearwardly by throttle governed fluid pressure exerted in the chamber 668 to interrupt communication between the clutch engaging fluid pressure in the branch conduit 530 and the conduit 534 leading to the cylinder 104 of the mechanical clutch B. The plunger 670 is urged forwardly to interconnect the conduits 530 and 534 to engage the clutch B by fluid pressure from the governor L responsive to the speed of the final driven shaft 134. The vehicle speed at which the clutch B will be engaged is thus dependent on the pressure developed by the governor L, and the throttle governed fluid pressure exerted in the chamber 668.

Referring now to Fig. 11 which illustrates the position of the selector valve I in the high range converter position with the selector lever 548 moved to position the pointer 572 at the position 580 on quadrant 574, it will be noted that the plunger 544 is moved somewhat rearwardly. An annular groove 690 in the plunger 544 is aligned with the conduits 526 and 528 to permit fluid to flow from the clutch modulating valve K to the cylinder 192 of the high range clutch F of the planetary gear train D. The controlling sun gear 152 is thus clutched to the intermediate shaft 46 whereupon torque is transmitted through the planetary gear train at a 1 to 1 speed ratio. It will be noted that the annular grooves 592 and 598 in the plunger 544 are of sufficient axial lengths to maintain interconnection between the conduits 504 and 536, and between the conduits 508 and 540 to maintain fluid pressure from the gallery 444 in the releasing chambers 256 of the low range brake E, and the reverse drive brake G to insure disengagement of these brakes.

The plunger 544 also has an axial groove 692 communicating with the vent port 596 to insure continuation of the venting of the actuation chamber 274 of the low range brake E. It will further be noted that the section 600 of reduced diameter at the rear end of the plunger 544 is of sufficient axial length to continue the venting of the actuating chamber 274 of the reverse drive brake G through conduit 542.

The position of the plunger 544 in the cylinder 510 of the selector valve I in the low range converter position is illustrated in Fig. 12. It will be noted that the plunger 544 has a land 694 adapted to close the conduit 526 from the clutch modulating valve K. A vent passage 696 interconnects the conduit 528, communicating with the cylinder 192 of the high range clutch F, with the vent passage 590 in the plunger 544, through an axial groove 698 to vent the high range clutch F thereby rendering it inoperable.

The plunger 544 has an annular groove 700 adapted to align with the conduit 538, and connected through an axial groove 702 with the conduit 506 to supply fluid under pressure through the conduit 538 to the actuating chamber 274 of the low range brake E, to lock the controlling sun gear 152 against rotation to transmit torque through the planetary gear train D at reduced speed, and with a corresponding increase in torque.

The rate of engagement of the brake E is controlled by metering the flow of fluid from the chamber 256 through the conduit 536 by means of a restricted orifice 704, communicating with the vent passage 590 in the plunger 544, a land 706 being provided to interrupt the flow of fluid from the conduit 504 connected with the pressure gallery 444.

It will also be noted that the actuating chamber 274 of the reverse drive brake G continues to be vented through the conduit 542 and the space between the section of reduced diameter 600 of the plunger 544 and the cylinder 510 at the rear end of the selector valve I.

In the reverse drive position illustrated in Fig. 13, the plunger 544 is moved to its rearmost position. The high range clutch F and the low range brake E are disengaged and the reverse drive brake G is engaged. The land 694 continues to interrupt the flow of fluid through the conduit 526 from the clutch modulating valve K, and the conduit 528 is vented through the groove 698 and vent passages 696 and 590. The brake disengaging chamber 256 of the low range brake E is subjected to fluid pressure through an annular groove 708, and the brake engaging chamber 274 is vented through passage 276 and conduit 538 and annular groove 710 connected with the vent passage 590.

The actuating chamber 274 of the reverse drive brake E is subjected to fluid pressure through the conduits 508 and 542 interconnected through the axially extended annular groove 598. The releasing chamber 256 of the reverse drive brake G is vented through a restricted orifice 712 communicating with the vent passage 590 through an annular groove 714.

The operation is as follows: To start the vehicle the selector lever 548 is positioned in either the neutral or park positions, at which time the pointer 572 will be aligned with the N or P positions 578 or 576 on the quadrant 574. Referring to Fig. 7 it will be noted that the arm 716, secured to the shaft 404 actuated by movement of the selector lever 548 through the linkage illustrated in Fig. 10, depresses a plunger 718 to engage the disk 720 with the contacts 722 positioned in the engine starter circuit thereby completing a circuit through the starting motor of the engine whereupon the engine may be started.

When the engine is operating at idling speed the front pump C develops fluid pressure and the pressure regulating valve 446 transmits pressure of approximately eighty pounds per square inch to the pressure supply gallery 444.

Fluid pressure from the supply gallery 444 is transmitted through the conduit 512 to the cylinder 518 of the throttle governing valve J, and flows through the axial groove 638 and radial port 640 in the movable sleeve 632 to the cross bore 642 in the plunger 602 operably connected to the accelerator pedal 604. Fluid then flows through the port 642 and bore 644 in the plunger 602 and is exerted on the forward face of the sleeve 632 in the chamber 648 to move the sleeve rearwardly against the spring 634 thereby reducing communication between the ports 640 and 642 to subject the chamber 648 to fluid pressure substantially proportionate to the speed increasing position of the accelerator pedal 604 under all conditions of operation.

Fluid pressure from the chamber 648 flows through the conduit 658 to the chamber 660 of the clutch modulating valve K to move the plunger 662 forwardly in the cylinder 520 thereby interconnecting the port 664 in the plunger 662 with the outlet from the branch conduit 516 to admit fluid from the supply gallery 444 to the cylinder 520 forwardly of the plunger 662. This pressure urges the plunger 662 rearwardly in the cylinder thereby reducing communication between the port 664 and the branch conduit 516. The clutch engaging pressure exerted on the fluid in the cylinder 520 of the clutch modulating valve K is thus proportionate to the speed increasing position of the accelerator pedal 604 at all times to vary the rate of engagement of the clutches B and F substantially in proportion to the speed increasing position of the accelerator pedal 604.

As illustrated in Fig. 10 fluid pressure exerted in the gallery 444 is directed to the torque converter A through the pressure relief valve 472 communicating with the pressure regulating valve 446. Fluid flows from the gallery 444 to the cylinder 448 of the pressure relief valve 446 illustrated in Fig. 9, through the passageway 458 in the end section 454 of the relief plunger 450, and is exerted in the chamber 460 against the end of the section 454 to move the plunger 450 against the resistance of the spring 464. The section 456 then uncovers the port 470 communicating with the torque converter A through the pressure regulating valve 472 illustrated in Fig. 9 to subject the space within the torque converter A to predetermined fluid pressure. Fluid flows through the torque converter and is discharged through the check valve 490 illustrated in Fig. 4. The check valve 490 may be set to discharge fluid at a lesser pressure than the pressure regulating valve 472 whereby a continuous flow of fluid may be established through the unit. Heat may thus be dissipated by exhausting heated fluid and admitting cooled fluid. If desired a heat exchanger or radiator may be provided to cool fluid admitted to the unit.

The transmission may be operated in the high or the low range positions, or if maximum acceleration is desired it may be started in the low range, and be shifted to the high range position when moderate speed has been attained. The operation in the high range position will first be described. The selector lever 548 is moved to position the pointer 572 in alignment with the H position 580 on the quadrant 574. This movement of the selector lever 548 operates through the above described linkage to position the plunger 544 of the selector valve I as illustrated in Fig. 11 to engage the high range clutch F and maintain the low range brake E and the reverse drive brake G disengaged.

The conduit 526 communicating with the cylinder 520 of the clutch modulating valve K is connected, through the annular groove 690 in the plunger 544 of the selector valve I, with the conduit 528 leading to the cylinder 192 of the high range clutch F to engage said clutch thereby locking the controlling sun gear 152 to the intermediate shaft 46 to lock up the planetary gear train D and transmit power from the intermediate shaft 46 to the final driven shaft 134 at a 1 to 1 speed ratio if the accelerated pedal 604 is depressed immediately after the selector lever is shifted to the high range position 580 on the quadrant 574, the rate of engagement of the high range clutch F will be proportioned to the speed increasing position of the accelerator pedal as previously described. If a time lag intervenes between the time the selector lever 548 is shifted to the high range position the clutch F will be engaged slowly and will be fully engaged to provide a 1 to 1 drive ratio through the planetary gear train D at the time the accelerator pedal 604 is depressed.

As indicated in Figs. 10 and 11 the actuating chambers 274 of the low range brake E and the reversed drive brake G are vented through the selector valve I. The conduit 538 from the actuating chamber of the low range brake E communicates with the central vent passage 590 in the plunger 544 through the port 596, and the conduit 542 from the actuating chamber of the reverse drive brake G communicates with the vent passage between the section 600 of reduced diameter at the rear of the plunger 544 and the cylinder 510.

Fluid under pressure is directed from the pressure supply gallery 444 through the conduits 504 and 508, and annular grooves 592 and 598 in the plunger 544, to the conduits 536 and 540 to exert pressure in the brake disengaging chambers 256 of the low range brake E and the reverse drive brake G. These elements are thus rendered inoperable.

Referring to Figs. 1 and 10, it will be noted that the impeller 21 of the torque converter A is driven by the crankshaft 10 during idling operation but at low engine speed there is not sufficient torque transmitted to the primary and secondary turbine members 30 and 32 to move the vehicle.

As the impeller 21 speeds up, power is transmitted from the turbine members 30 and 32, through the hub 42 to the intermediate shaft 46, and through the locked up planetary gear train D to the final driven shaft 134 to drive the vehicle. The reaction member 54 interposed between the first and second stage turbine members 30 and 32 redirects the fluid as it flows between the first and second stage turbine members in such a manner that a reaction force is exerted through the one-way brake 66 to the housing 216 and power is transmitted to the intermediate shaft 46 with an increase of torque. As speed increases the angularity of the fluid entering the reaction member 54 decreases, accompanied by an increase of the speed of the turbine relative to the impeller, and a reduction of torque multiplication until such a point that a forwardly directed force is exerted on the reaction member. The device then operates as a fluid coupling to transmit power at a substantially 1 to 1 speed ratio with no increase in torque, the reaction member 54 rotating forwardly in the fluid circuit on the one-way brake 66 whereupon minimum frictional losses are encountered.

As the speed of the vehicle continues to increase, the throttle governed pressure in the chamber 648 of the throttle governor valve J, and in the chamber 668 of the direct drive shift valve M increases substantially proportionately to movement of the accelerator pedal 604 in the speed increasing direction. This force urges the plunger 670 of the direct drive shift valve M rearwardly to maintain the plunger 670 in the interrupting position between the conduit 530 from the clutch modulating vlave K and the conduit 534 leading to the mechanical clutch B interposed between the driving shaft 10 and the intermediate shaft 46. The clutch B is thus maintained inoperable until the pressure exerted in the chamber 680 of the direct drive shift valve M from the governor L is sufficient to overcome the throttle governed fluid pressure in the chamber 668.

Referring to the governor L illustrated in Figs. 4, 6 and 10, it will be noted that the spring 322 urges the member 312 outwardly in the bore 310 to position the axial groove 340 to interconnect the inlet passage 338, in the rotatable member 296, and the internal groove 344, in the member 304, to admit fluid to the chamber 346 between the shoulder 318 in the member 304 and the step in the piston member 312. Fluid pressure exerted in the chamber 346 urges the member 312 radially inwardly against the resistance of spring 322 and centrifugal force exerted on the member 312 to restrict the flow of fluid to the chamber 346 through the axial groove 340 in the member 312. As the speed of rotation of the final driven shaft 134 increases, the member 312 is urged further outwardly thereby admitting additional fluid and increasing the pressure in the chamber 346 in proportion to the speed of the final driven shaft 134.

The spring 330 urging the plunger 324 and weight 326 inwardly is of sufficient strength to prevent the plunger from shifting outwardly to align the axial groove 358 with the radial ports 348 and 350 until the final driven shaft is rotating at a speed corresponding with approxiaxial groove 674 in the plunger 670 permits fluid to flow from conduit 530 through cylinder 532 into conduit 534, as illustrated in Fig. 14, to engage the mechanical clutch B by fluid pressure from the clutch modulating valve K. Torque is then transmitted from the driving shaft 10 and flywheel 14 through the mechanical clutch B to the intermediate shaft 46, thereby rendering the torque converter A inoperable except as a flywheel and providing a 1 to 1 mechanical drive between the driving shaft 10 and the intermediate shaft 46.

In view of the fact that in the high range position under consideration, the clutch F of the planetary gear train D is engaged to provide a 1 to 1 drive through the planetary gear train, power is transmitted directly from the drive shaft 10 to the final driven shaft 134 at a 1 to 1 speed ratio thus providing a direct mechanical drive to the final driven shaft 134.

To operate the transmission in the low range position the selector lever 548 is shifted to align the pointer 572 with the position 582, marked L on the quadrant 574 illustrated in Fig. 15. The plunger 544 of the selector valve I is thus moved to the position illustrated in Fig. 12 wherein the low range brake E is engaged, the high range clutch F and the reverse drive brake G being disengaged.

The actuating chamber 274 of the low range brake E is subjected to fluid pressure through the conduit 538, aligned through the annular groove 700 in the plunger 544 and axial groove 702 with the conduit 506 communicating with the pressure gallery 444. As fluid flows through the actuating chamber 274 it flows through the annular passageway 272, and is exerted on the bottom face of the disk type valve 266. The objectionable time lag. The venting however gives a cushioning effect against the piston preventing too sudden an engagement which would result in undue harshness.

When the low range brake E is engaged, the controlling sun gear 152 illustrated in Fig. 1 is locked against rotation whereupon power is transmitted from the intermediate shaft 46 through the driving sun gear 146 to the long pinion gears 144. The long pinion gears 144 drive the short pinion gears 150 which roll around the stationary controlling sun gear 152 to drive the planet carrier 138 secured to the final driven shaft 134 in the forward direction at reduced speed. An increase in torque substantially proportional to the reduction in speed is achieved to accelerate the vehicle. In the low range position torque is multiplied both in the torque converter A and in the planetary gear train D to provide high torque multiplication to effect rapid acceleration of the vehicle.

As illustrated in Fig. 14, when the vehicle is traveling at a sufficiently high speed that the pressure developed by the governor L in chamber 680 overcomes the throttle governed fluid pressure in chamber 668 exerted on the plunger 670 of the direct shift valve M, fluid flows from conduit 530 to conduit 534 to engage the mechanical clutch B to interrupt operation of the torque converter A as previously described.

As stated above, for maximum acceleration when starting, the transmission may be shifted into the low range position and may be thereafter manually shifted to the high range position to provide a 1 to 1 drive through the planetary gear train D. The torque converter A will be rendered inoperable by operation of the clutch B to provide a 1 to 1 mechanical drive between the driving shaft 10 and the final driven shaft 134 before or after the selector lever is moved to the high range position depending on the speed increasing position of the accelerator pedal 604.

To effect this operation, the selector lever 548 is positioned to locate the pointer 572 at the low range position 582 on the quadrant 574 whereupon the plunger 544 of the selector valve I is positioned as illustrated in Fig. 12. The vehicle may then be accelerated rapidly by extensive movement of the accelerator pedal 604 in the speed increasing direction to provide high torque multiplication through the torque converter A and the planetary gear train D.

When a desired vehicle speed has been attained, the selector lever 548 may be manually shifted to position the pointer 572 in alignment with the high range position 580 on the quadrant 574 thereby moving the plunger 544 of the selector valve I to the position illustrated in Fig. 11 to disengage the low range brake E and engage the high range clutch F as previously discussed. Torque is then multiplied by the torque converter A with the planetary gear train D operating at a 1 to 1 speed ratio. When the speed of the vehicle increases to such a point that the pressure exerted on the plungers 678 and 670 by the governor L in the chamber 680 of the direct drive shift valve M overcomes the throttle governed pressure in the chamber 668, the plunger 670 is shifted forwardly to interconnect the conduits 530 and 534 as illustrated in Fig. 14, thereby engaging the mechanical clutch B and rendering the torque converter A inoperable except as a flywheel. Power is then transmitted from the driving shaft 10 to the final driven shaft 134 with no increase of torque, and at a speed ratio of 1 to 1.

If additional power is required as for example to pass another vehicle when the transmission is operating to provide a direct mechanical drive from the driving shaft 10 to the final driven shaft 134, the driver may selectively reengage either or both the torque converter A or the torque increasing function of the planetary gear train D.

To reengage the torque converter A when the clutch B is engaged, the driver depresses the accelerator pedal 604 in the engine speed increasing direction to a kickdown position.

As pointed out above, the fluid pressure exerted in the chamber 648 of the throttle governor valve J increases substantially in proportion to the speed increasing position of the accelerator pedal 604. The pressure exerted in the chamber 648 of the throttle governor valve J is of course transmitted through the conduit 658 and is exerted in the chamber 668 of the direct drive shift valve M to urge the plungers 670 and 678 rearwardly in opposition to the pressure exerted in the chamber 680 on the plunger 678 from the governor L, and on the exposed rear surface of the plunger 670 by the clutch engaging fluid pressure from the conduit 530. When the force thus exerted on the forward end of the plunger 670 overcomes the force exerted by the speed governed fluid pressure, the plungers 670 and 678 shift rearwardly from the position illustrated in Fig. 14 to the position illustrated in Fig. 10. The actuating chamber 104 of the clutch B is then vented through the vent passage 676 as illustrated in Fig. 10 whereupon the clutch B is disengaged, and the torque converter A is rendered operable to multiply torque and provide the increased power required to accelerate the vehicle.

To disengage the clutch B thereby reengaging the torque converter A, it is necessary to depress the accelerator pedal 604 to the kickdown position, beyond the full throttle position. This movement of the accelerator pedal retracts the plunger 602 in the cylinder 518 whereupon the sleeve 632 also moves rearwardly due to the increase of pressure in chamber 648 compressing spring 634, and subjecting the chamber 668 of the direct drive shift valve M to substantially the full pressure exerted in the fluid supply gallery 444. This pressure overcomes the speed governed pressure exerted on the plunger 678 in the chamber 680 from the governor L, and the pressure exerted on the rear exposed face of the plunger 670 from the chamber 520 of the clutch modulating valve K and urges the plungers 670 and 678 rearwardly to disengage the clutch B and again render the torque converter A operable.

If desired, the drive may when operating in direct drive from the driving shaft 10 to the final driven shaft 134 take advantage of the torque increasing function of the planetary gear train D to obtain increased acceleration as for example to pass another vehicle. This may be accomplished by shifting the selector lever 548 from the high range position 580, illustrated in Fig. 15, to the low range position 582, it being noted that it is unnecessary to release the accelerator pedal 604 to effect this shift.

As illustrated in Figs. 1, 10 and 11, the clutch F will be disengaged to release the controlling sun gear 152 from the intermediate shaft 46, and the brake E engaged to lock the controlling sun gear 152 against rotation. The flow of fluid is metered from the clutch engaging chamber 192 of the clutch F to effect the slow disengagement of the clutch, and the engagement of the brake E is synchronized with the disengagement of the clutch F to interrupt the direct drive through the planetary gear train D and engage the torque increasing drive therethrough with substantially no interruption of the flow of power to the final driven shaft 134.

To effect reverse drive the outer end of the selector lever 548 is elevated and is moved to align the pointer 572 with the position R at 584 (Fig. 15) on the quadrant 574, whereupon the plunger 544 of the selector valve I is shifted to the position illustrated in Fig. 13. The axially extending annular groove 598 in the plunger 544 then interconnects the conduit 508 from the pressure gallery 444 with the conduit 542 leading to the actuating chamber 274 of the reverse drive brake G. This brake engaging mechanism operates in the manner described in connection with the low range brake E to engage its brake band with the drum 210 thereby locking the ring gear 208 against rotation, the mechanical clutch B, the high range clutch F and the low range brake E being disengaged as previously described.

When the ring gear 208 is locked against rotation, the short pinion gears 150 roll around the ring gear 208. The carrier 138 secured to the final driven shaft 134 is then driven in the reverse direction as power applied by the driving sun gear 146 rotates the long pinion gears 144 meshing with the short pinion gears 150.

It will be noted that the reverse drive position 584 is positioned on the quadrant 574, Fig. 15, adjacent the low range position 582. It is therefore possible for a driver to rapidly shift from the reverse to the low range positions and vice versa to rock the vehicle to facilitate its release when it is stuck.

To engage the parking position to lock the final driven shaft 134 against rotation, the selector lever 548 is moved to align the pointer 572 with the indication P 576 on the quadrant 574. As illustrated in Figs. 7 and 8, the lever 410 actuated by movement of the selector lever 548 as illustrated in Fig. 10 rotates the shaft 404. The arms 400 actuated through the spring 426 then move the roller 396 into operating engagement with the cam 398 to move the sprag 390 carried by the lever 392 into engagement with the teeth 388 of the parking gear 380 splined to the final driven shaft 134. If the sprag 390 contacts one of teeth 388, the spring 426 permits the shaft 404 to move within the arms 400 to the end of its cycle of movement whereupon the spring 426 yieldingly urges the sprag 390 into mesh with the space between a pair of teeth 388 of the gear 380 when the gear rotates slightly to remove the interference.

When the selector lever 548 is moved out of the parking position, the surfaces 422 engage the surfaces 424 as illustrated in Fig. 1 to positively withdraw the arms 400 from the lever 392 which carries the sprag. The spring 412 combined with the camming action of the teeth 388 then oscillates the lever 392 to withdraw the sprag from meshing engagement with the teeth of the parking brake.

Attention is again directed to the fact that as illustrated in Fig. 10, the mechanical clutch B and the high range clutch F are engaged with fluid pressure from the clutch modulating valve K proportionate to the speed increasing position of the accelerator pedal 604, because the plunger 662 of the clutch modulating valve K is subjected to throttle governing fluid pressure in the chamber 660 to provide fluid pressure in the cylinder 528 forwardly of the plunger 662 proportionate to the speed increasing position of the accelerator pedal. It will also be noted that the low range brake E and the reverse drive brake G are engaged progressively due to the metering of fluid flowing from their respective disengaging chambers 256 through the restricted orifices in the selector valve I.

The time of engagement of the mechanical clutch B to render the torque converter A inoperable is influenced by the position of the accelerator pedal 604 controlling the fluid pressure exerted in the chamber 668 of the direct drive shift valve M to oppose shifting of the plungers 670 and 678 to delay engagement of the clutch B in proportion to the speed increasing position of the accelerator pedal, the plungers 670 and 678 being urged forwardly to engage the mechanical clutch B by fluid pressure developed by operation of the governor L.

To start the engine by pushing or pulling the vehicle, the selector lever 548 is preferably positioned in the neutral position 578 on the quadrant 574 of Fig. 15. The vehicle is then pushed or pulled whereupon the final driven shaft 134 is driven since it is geared to the driving wheels of the vehicle. Rotation of the final driven shaft 134 rotates the impeller 440 of the rear pump H to subject the supply gallery 444 to fluid pressure. When a vehicle speed of approximately 20 to 25 miles per hour has been attained the selector lever 548 is preferably shifted to the high range position 580 on the quadrant 574 of Fig. 15 to position the plunger 544 of the selector valve I in the position illustrated in Fig. 11. While the vehicle is being pushed the accelerator pedal 604 is preferably in the released position, and it is depressed somewhat at the time the selector lever 548 is shifted to the high range position. Fluid flows from the supply gallery 444 through the conduit 512 to the throttle governing valve J and to the clutch modulating valve K as hereinabove described. Fluid flows from the clutch modulating valve K, through the conduit 526 and groove 690 in the plunger 544 of the selector valve I, through conduit 526 to the chamber 192 to engage the clutch F thereby locking the controlling sun gear 152 to the intermediate shaft 46 to lock up the planetary gear train D to drive the intermediate shaft 46 at a 1 to 1 speed ratio with the final driven shaft 134.

Fluid under pressure from the gallery 444 is directed through the conduit 522 to the governor L to subject the conduit 682 and chamber 680 of the direct drive shift valve M to fluid pressure to actuate the plungers 678 and 670 thereby directing fluid under pressure from the clutch modulating valve K through the conduit 534 to the cylinder 194 to engage the clutch B thereby rendering the torque converter A inoperable except as a flywheel and providing a direct mechanical drive from the final driven shaft 134 to the driving member 10 to crank the engine.

The braking effect of the engine may effectively be used to slow down the vehicle when descending hills. The selector lever 548 may be positioned in the low range position 582, whereupon the brake E is engaged to lock the controlling sun gear 152 against rotation to drive the intermediate shaft 46 at increased speed thereby overspeeding the engine to obtain greater retarding effect therefrom.

The governor valve, throttle governor valve and clutch modulating valve are in effect pressure reducing or regulating valves. It will of course be understood that wherever the terms governor valve, throttle governor valve, and clutch modulating valve appear, they are intended to cover and include pressure regulating or reducing valves generally.

It will be apparent that other forms of the invention may be employed without departing from the spirit of my invention.

I claim:

1. In combination an engine, an accelerator to control the speed of said engine, and a transmission cooperating with said engine, the combination including a driving member, a driven member, a torque converter having impeller and turbine members operably connected to the driving member and to the driven member, a mechanical clutch in parallel with the torque converter to rotate the impeller and turbine members in unison, a source of fluid pressure, fluid actuated means to engage said clutch, accelerator pedal actuated means to develop fluid pressure substantially proportionate to the speed increasing position of the accelerator pedal, a second fluid pressure actuated means to develop a modulated clutch engaging fluid pressure substantially proportionate to the speed increasing position of the accelerator pedal, a chamber to receive fluid under said pressure substantially proportionate to the speed increasing position of the accelerator pedal to actuate said second means, a governor to develop fluid pressure substantially proportionate to the speed of the driven shaft, and a third means responsive jointly to fluid pressure developed by the speed increasing position of the accelerator pedal and by fluid pressure developed by the governor to direct said clutch engaging fluid pressure to said fluid actuated means to engage said mechanical clutch when the force exerted by the governed fluid pressure exceeds the force exerted by the accelerator pedal controlled fluid pressure, said second and third means being disposed on opposite sides of and exposed to the fluid pressure in said chamber.

2. In a control mechanism for a transmission of an accelerator pedal controlled engine, a friction clutch to establish a predetermined speed ratio drive through the transmission, a source of fluid pressure, a pressure reducing valve comprising a cylinder, fluid pressure actuated means in the cylinder to develop fluid pressure proportionate to the speed increasing position of the accelerator pedal; a clutch modulating valve comprising a cylinder, a plunger slidably mounted in the cylinder, a plunger actuating chamber on one side of the plunger, a clutch modulating chamber on the other side of the plunger, means to subject the plunger actuating chamber to fluid pressure developed by the pressure reducing valve, the plunger having a port adapted to communicate with said source to admit fluid under pressure to the clutch modulating chamber in response to an increase in pressure in the plunger actuating chamber, the plunger moving in response to an increase of pressure in the clutch modulating chamber to reduce communication between said port and the source of fluid pressure to maintain fluid pressure in said clutch modulating chamber proportionate to the speed increasing position of the accelerator pedal, fluid pressure actuated means to engage said clutch, and connecting means between the clutch modulating chamber and said fluid pressure actuated means.

3. In a control mechanism for a transmission of an accelerator pedal controlled engine, a friction clutch to establish a predetermined speed ratio drive through the transmission, a source of fluid pressure, a pressure reducing valve comprising a cylinder, a sleeve slidably mounted in the cylinder, yielding means urging the sleeve toward one end of the cylinder, a chamber between the sleeve and said one end of the cylinder, a plunger slidably mounted in the sleeve, motion transmitting means between the accelerator pedal and the plunger to move the plunger proportionate to speed increasing position of the accelerator pedal, connecting means between the source of fluid pressure and the cylinder, the sleeve having a radial port and a connected axially extending groove communicating with the connecting means from said source of fluid pressure and the plunger having interconnected radial ports adapted to communicate with the radial port of the sleeve to admit fluid from said source to said chamber to increase fluid pressure therein in response to speed increasing movement of the accelerator pedal, the sleeve moving in opposition to said yielding means in response to an increase of pressure in said chamber to decrease communication between said ports to maintain fluid pressure in said chamber proportionate to the speed increasing position of the accelerator pedal; a clutch modulating valve comprising a cylinder, a plunger slidably mounted in the cylinder, a chamber between one end of the cylinder and the plunger, connecting means between said chamber and the chamber of the pressure reducing valve whereby the plunger of the clutch modulating valve is subjected to fluid pressure proportionate to the speed increasing position of the accelerator pedal, connecting means between said source of fluid pressure and the cylinder of the clutch modulating plunger having a port adapted to communicate with connecting means from said source to admit fluid under pressure therefrom to a clutch modulating chamber at the opposite end of said plunger in response to an increase in throttle governed fluid pressure, the plunger moving in response to an increase of pressure in the clutch modulating chamber to decrease communication between the last named port and said source to maintain fluid pressure in said clutch modulating chamber proportionate to the speed increasing position of the accelerator pedal, fluid pressure actuated means to engage said clutch, and connecting means between the clutch modulating chamber and said fluid pressure actuated means.

4. A control for an engine and a clutch driven by the engine, said clutch having a power output member and fluid pressure actuated means for operating the said clutch; said control comprising an engine power control having a plurality of positions, a source of fluid under pressure, first and second pressure reducing valves, each of said valves being in direct hydraulic communication with said source of fluid, means connecting the first pressure reducing valve to the engine power control to vary the output pressure of the first pressure reducing valve in accordance with the position of the power control, variable fluid pressure means for operating the second pressure reducing valve to modulate its output pressure so that the output pressure increases with the speed increasing position of said control, a third pressure reducing valve in hydraulic communication with the said source of fluid, means responsive to the speed of rotation of the clutch output member for operating the third pressure reducing valve, and means operated jointly by the output pressures of the first and third pressure reducing valves to connect the output of the second pressure reducing valve to the clutch operating means, whereby to control the operation of the clutch.

5. A control for an engine and a clutch driven by the engine, said clutch having a power output member and fluid pressure operated means for operating the clutch, said control comprising an engine power control, a source of fluid under pressure, first and second pressure reducing valves, both of said valves being directly connected to said source of fluid, means for actuating the said pressure reducing valves in unison with the operation of the engine power control, said actuating means including a structure to produce a variable pressure reduction in the output from said second valve, a third pressure reducing valve connected to the source of fluid under pressure, means for actuating the third pressure reducing valve in accordance with the speed of rotation of the clutch power output member, means responsive jointly to the fluid pressure supplied by the first and third pressure reducing valves for controlling the output of the second pressure reducing valve, and means connecting the controlled output of the second reducing valve to the clutch operating means for controlling the operation of the clutch.

6. A control for an engine and a clutch driven by the engine, said clutch having a power output member and fluid pressure actuated means for operating the said clutch; said control comprising an engine power control having a plurality of positions, a source of fluid under pressure, first and second pressure reducing valves in direct hydraulic communication with said source of fluid, means connecting the first pressure reducing valve to the engine power control to vary the output pressure of the said first pressure reducing valve in accordance with the position of said power control, means for applying the output pressure of the said first pressure reducing valve to the second pressure reducing valve to effect a relatively wide variation of the output pressure of the second valve in accordance with the position of the said power control, a third pressure reducing valve in hydraulic communication with said source of fluid under pressure, means responsive to the speed of rotation of the clutch output member for operating the third pressure reducing valve, and means operated jointly by the output pressures of the first and third pressure reducing valves to connect the output of the second pressure reducing valve to the clutch operating means, whereby to control the operation of the clutch.

7. A control for an engine and a clutch driven by the engine, said clutch having a power output member and fluid pressure operated means for operating the said clutch; said control comprising an engine power control having a plurality of positions, a source of fluid under pressure, first and second pressure reducing valves in direct hydraulic communication with said source of fluid, means connecting the first pressure reducing valve to the engine power control to vary the output pressure of the said first pressure reducing valve in accordance with the position of the said power control, a valve body having a chamber therein in communication with the output pressure of the first pressure reducing valve, said second pressure reducing valve being disposed in the valve body and having one side thereof exposed to the pressure in said chamber so as to be actuated thereby, a third pressure reducing valve in hydraulic communication with the said source of fluid, means responsive to the speed of rotation of the clutch output member for operating the third pressure reducing valve, and means having one side exposed to the pressure in said chamber and operated jointly by the output pressures of the first and third pressure reducing valves to connect the output of the second pressure reducing valve to the clutch operating means, whereby to control the operation of the clutch.

8. A control as described in claim 7, said last-mentioned means including a plunger in said valve body and having one end exposed to the pressure in said chamber.

9. A control as described in claim 7, said last mentioned means including a plunger disposed in said valve body and having one end exposed to the pressure in said chamber, and means conducting the output pressure of the third pressure reducing valve to the opposite end of the said plunger.

10. A control as described in claim 7, said last-mentioned means including a plunger disposed in said valve body and having one end exposed to the pressure in said chamber, means for subjecting the opposite side of said plunger to the output pressure of the third pressure reducing valve, and means for subjecting the plunger to the output pressure of said second pressure reducing valve in the same direction as the pressure of the third reducing valve after the plunger has been moved in said direction whereby to delay restoration of the plunger to its original position after the output pressure of the third said valve falls below that of the first-mentioned pressure reducing valve.

11. A control for an engine and a clutch driven by the engine, said clutch having a power output member and fluid pressure operated means for operating the clutch; said control comprising an engine power control having a plurality of positions, a source of fluid under pressure, first and second pressure reducing valves in hydraulic communication with said source of fluid, means connecting the first pressure reducing valve to the engine power control to vary the output pressure of the said first pressure reducing valve in accordance with the position of the said power control, a valve block having a chamber therein in communication hydraulically with the output of the first pressure reducing valve so that the pressure of the fluid in said chamber varies in accordance with the position of the power control member, said second pressure reducing valve being exposed to the pressure of the fluid in the said chamber and operated thereby, a third pressure reducing valve in hydraulic communication with the said source of fluid, means responsive to the speed of rotation of the clutch output member for operating the third pressure reducing valve, and means operated jointly by the output pressures of the first and third pressure reducing valves to connect the output of the second pressure reducing valve to the clutch operating means, whereby to control the operation of the clutch.

12. A control for an engine and a clutch driven by the engine, said clutch having a power output member and fluid pressure actuated means for operating the clutch, said control comprising an engine power control having a plurality of positions, a source of fluid under pressure, first and second pressure reducing valves in hydraulic communication with said source of fluid under pressure, means connecting the first pressure reducing valve to the engine power control to vary the output pressures of the said first pressure reducing valve in accordance with the position of the said power control, means for operating the second pressure reducing valve from the output pressure of the first pressure reducing valve, a third pressure reducing valve in hydraulic communication with the said source of fluid, means responsive to the speed of rotation of the clutch output member for operating the said third pressure reducing valve, a plunger means for conducting the output of the first pressure reducing valve to one end of the said plunger, means for conducting the output of the third pressure reducing valve to the end of said plunger opposite said one end so as to control the operation of the plunger jointly in accordance with the operation of the engine power control and the speed of the clutch output member, and means connecting the plunger to a source of fluid under pressure and to the clutch operating means whereby likewise to control the operation of the clutch in accordance with the operation of the engine power control and the speed of the clutch output member.

13. A control for an engine and a clutch driven by the engine, said clutch having a power output member and fluid pressure actuated means for operating the clutch, said control comprising an engine power control having a plurality of positions, a source of fluid under pressure, first and second pressure reducing valves in hydraulic communication with said source of fluid under pressure, means connecting the first pressure reducing valve to the engine power control to vary the output pressure of the said first pressure reducing valve in accordance with the position of the said power control, a valve block having a chamber therein, means for conducting the output fluid of the first pressure reducing valve to the chamber, said second pressure reducing valve being disposed in said valve block and having one end thereof in said chamber and exposed to the first pressure reducing valve output pressure, a piston valve also disposed in said valve block and having one end thereof in said chamber and exposed to the first pressure reducing valve output pressure, a third pressure reducing valve in hydraulic communication with the said source of fluid, means responsive to the speed of rotation of the clutch output member for operating the said third pressure reducing valve, means for conducting the output of the said third pressure reducing valve to the end of said piston valve opposite said one end so as to control the operation of the piston valve jointly in accordance with the operation of the engine power control and the speed of the clutch output member, and means connecting the piston valve to the clutch operating means whereby likewise to control the operation of the clutch in accordance with the operation of the engine power control and the speed of the clutch output member.

14. A control as described in claim 4, said first pressure reducing valve comprising a valve block having a bore, a sleeve in the bore, a plunger reciprocable in said sleeve and connected to move with the means connecting the first pressure reducing valve to the engine power control, inlet and outlet openings in the plunger, inlet and outlet openings in the sleeve, means for subjecting one end of said sleeve to the plunger outlet fluid pressure, resilient means acting against the other end of said sleeve and opposing the said plunger outlet fluid pressure, and means for progressively aligning the sleeve outlet opening with the plunger outlet opening.

15. A control as described in claim 4, said second pressure reducing valve comprising a cylinder, a plunger in said cylinder, said cylinder and plunger having crossbores adapted when aligned to conduct fluid under pressure to one end of said plunger to urge said plunger toward a position wherein the crossbores are not aligned, and means connecting the output of the first pressure reducing valve to the other end of said plunger to urge said plunger toward a position in which said crossbores are aligned.

16. A control as described in claim 4, said first pressure reducing valve comprising a valve block having a bore, a sleeve in the bore, a plunger reciprocable in said sleeve and connected to move with the means connecting the first pressure reducing valve to the engine power control, inlet and outlet openings in the plunger, inlet and outlet openings in the sleeve, means for subjecting one side of said sleeve to the plunger outlet fluid pressure, resilient means opposing the said plunger outlet fluid pressure, and means for progressively aligning the sleeve outlet opening with the plunger outlet opening; and said second pressure reducing valve comprising a cylinder, a plunger in said cylinder, said cylinder and last-mentioned plunger having crossbores adapted when aligned to conduct fluid under pressure to one end of said last-mentioned plunger to urge said last-mentioned plunger toward a position wherein the crossbores are not aligned, and means connecting the output of the first pressure reducing valve to the other end of the last-mentioned plunger to urge said last-mentioned plunger toward a position in which said crossbores are aligned.

17. A control as described in claim 4, said third pressure reducing valve comprising a rotatable support having inlet and outlet passages therein, a weighted piston valve, a radially disposed bore in the rotatable support to receive the weighted piston valve, resilient means urging the valve outward in the same direction as the action of centrifugal force on the said piston valve, said support having a second bore of greater diameter than the diameter of the first mentioned bore and said piston valve having a portion of increased diameter in said second bore and forming an annular piston on said piston valve, and means for conducting fluid under pressure from the inlet passage to the annular piston to create a force which opposes the combined force of the resilient means and centrifugal force, said connecting means restricting flow of fluid from the inlet passage to the annular piston in accordance with the value of the said combined force whereby to create a fluid pressure which varies in accordance with the speed of the said output member.

18. A control as described in claim 4, said first pressure reducing valve comprising a valve block having a bore, a sleeve in the bore, a plunger reciprocable in said sleeve and connected to move with the means connecting the first pressure reducing valve to the engine power control, inlet and outlet openings in the plunger, inlet and outlet openings in the sleeve, means for subjecting one end of said sleeve to the plunger outlet fluid pressure, resilient means acting against the other end of said sleeve and opposing the said plunger outlet fluid pressure, and means for progressively aligning the sleeve outlet opening with the plunger outlet opening; and said third pressure reducing valve comprising a rotatable support having a radially disposed compound bore therein with inlet and outlet passages communicating with the said compound bore, a weighted piston valve in said compound bore and having two portions of different diameter, one for each part of the compound bore; resilient means urging the piston valve toward the smaller of the two bores and in the same direction as the action of centrifugal force on the said piston valve, said piston valve having an axially disposed passage for conducting fluid from the inlet passage to the valve portion of larger diameter where said valve portion of larger diameter joins the valve portion of smaller diameter such that the fluid pressure at said juncture opposes the said combined force of the resilient means and centrifugal force acting on said piston valve, said axially disposed passage being located to variably restrict the inlet passage whereby to develop a fluid pressure which varies in accordance with the speed of the clutch output member as aforesaid.

19. A control as described in claim 4, said second pressure reducing valve comprising a cylinder, a plunger in said cylinder, said cylinder and plunger having crossbores adapted when aligned to conduct fluid under pressure to one end of said plunger to urge said plunger toward a position wherein the crossbores are not aligned, and means connecting the output of the first pressure reducing valve to the other end of said plunger to urge said plunger toward a position in which said crossbores are aligned; and said third pressure reducing valve comprising a rotatable support having a radially disposed compound bore therein with inlet and outlet passages communicating with the said bore, a weighted piston valve in said bore and having two portions of different diameter, one for each portion of the compound bore; resilient means urging the piston valve toward the smaller of the two bores and in the same direction as the action of centrifugal force on the said piston valve, said piston valve having an axially disposed passage for conducting fluid from the inlet passage to the valve portion of larger diameter where said valve portion of larger diameter joins the valve portion of smaller diameter such that the fluid pressure at said juncture opposes the said combined force of the resilient means and centrifugal force acting on said piston valve, said axially disposed passage being located to variably restrict the inlet passage whereby to develop a fluid pressure which varies in accordance with the speed of the clutch output member as aforesaid.

20. A control as described in claim 4, said first pressure reducing valve comprising a valve block having a bore, a sleeve in the bore, a plunger reciprocable in said sleeve and connected to move with the means connecting the first pressure reducing valve to the power control, inlet and outlet openings in the plunger, inlet and outlet openings in the sleeve, means for subjecting one end of said sleeve to the plunger outlet fluid pressure, and means for progressively aligning the sleeve outlet opening with the plunger outlet opening; said second pressure reducing valve comprising a cylinder, a plunger in the cylinder, said cylinder and second mentioned plunger having crossbores adapted when aligned to conduct fluid under pressure to one end of said second plunger to urge said second plunger toward a position wherein the crossbores are not aligned, and means connecting the output of the first pressure reducing valve to the other end of said second plunger toward a position in which said crossbores are aligned; and said third pressure reducing valve comprising a rotatable support having a radially disposed compound bore therein with inlet and outlet passages communicating with the said bore, a weighted piston valve in said bore and having two portions of different diameter, one for each portion of the compound bores; resilient means urging the weighted piston valve toward the smaller of the two bores and in the same direction as the action of centrifugal force on the said weighted piston valve, said weighted piston valve having an axially disposed passage for conducting fluid from the inlet passage to the valve portion of larger diameter where said valve portion of larger diameter joins the valve portion of smaller diameter such that the fluid pressure at said juncture opposes the said combined force of the resilient means and centrifugal force acting on said piston valve, said axially disposed passage being located to variably restrict the inlet passage whereby to develop a fluid pressure which varies in accordance with the speed of the clutch output member as aforesaid.

21. In a transmission for an accelerator pedal controlled engine, a driving member, a driven member, a torque converter having impeller and turbine members operably connected to the driving and driven members, a mechanical clutch in parallel with the torque converter to rotate the impeller and turbine members in unison, a source of fluid pressure, accelerator pedal actuated means including a pressure reducing valve to develop fluid pressure substantially proportionate to the position of the accelerator pedal influencing the engagement of the mechanical clutch, said pressure reducing valve comprising a cylinder, a plunger slidably mounted in the cylinder, motion transmitting means between the accelerator pedal and the plunger to move the plunger proportionately to the movement of the accelerator pedal, fluid conducting means connecting the source of fluid pressure and the cylinder, and fluid pressure actuated means cooperatively mounted between the plunger and the cylinder and adapted variably to restrict the flow of fluid from the cylinder to develop fluid pressure proportionately to the movement of the accelerator pedal.

22. In a transmission for an accelerator pedal controlled engine, a driving member, a driven member, a torque converter having impeller and turbine members operably connected to the driving and driven members, a mechanical clutch in parallel with the torque converter to rotate the impeller and turbine members in unison, a source of fluid pressure, accelerator pedal actuated means including a pressure reducing valve to develop fluid pressure substantially proportionate to the position of the accelerator pedal influencing the engagement of the mechanical clutch, said pressure reducing valve comprising a cylinder communicating with said source of fluid pressure, a plunger slidably mounted in the cylinder and having spaced cross bores interconnected by a longitudinal bore, motion transmitting means between the plunger and the accelerator pedal whereby the plunger is moved in the cylinder in proportion to speed increasing movement of the accelerator pedal, a sleeve slidably mounted on the plunger and defining a chamber at one end of the cylinder, yielding means urging the sleeve toward said one end of the cylinder, the sleeve having an axially extending groove adapted to communicate with said source of fluid pressure and a cross bore to admit fluid from said source to said chamber through the interconnected bores in the plunger to subject the chamber to fluid pressure proportionate to speed increasing movement of the accelerator pedal.

23. In a transmission for an accelerator pedal controlled engine, a driving member, a driven member, a torque converter having impeller and turbine members operably connected to the driving and driven members, a mechanical clutch in parallel with the torque converter to rotate the impeller and turbine members in unison, a source of fluid pressure, accelerator pedal actuated means including a pressure reducing valve to develop fluid pressure substantially proportionate to the position of the accelerator pedal influencing the engagement of the mechanical clutch, said pressure reducing valve comprising a cylinder, a sleeve slidably mounted in the cylinder, yielding means urging the sleeve toward one end of the cylinder, a chamber between the sleeve and said on end of the cylinder, a plunger slidably mounted in the sleeve, motion transmitting means between the accelerator pedal and the plunger to move the plunger proportionately to the speed increasing position of the accelerator pedal, and connecting means between the source of fluid pressure and the cylinder, the sleeve having a radial port and a connected axially extending groove communicating with the connecting means from said source of fluid pressure and the plunger having interconnected radial ports adapted to communicate with the radial port of the sleeve to admit fluid from said source to said chamber to increase fluid pressure therein in response to speed increasing movement of the accelerator pedal, the sleeve moving in opposition to said yielding means in response to an increase of pressure in said chamber to decrease communication between said ports to maintain fluid pressure in said chamber proportionate to the speed increasing position of the accelerator pedal.

24. In a transmission for an accelerator pedal controlled engine, a driving member, a driven member, a speed ratio changing device between the driving and driven members, friction means controlling the speed ratio changing device, a source of fluid pressure, accelerator pedal actuated means including a pressure reducing valve to develop fluid pressure substantially proportionate to the position of the accelerator pedal influencing the control of the friction means, said pressure reducing valve comprising a cylinder, a plunger slidably mounted in the cylinder, motion transmitting means between the accelerator pedal and the plunger to move the plunger proportionate to the position of the accelerator pedal, fluid conducting means connecting the source of fluid pressure and the cylinder, and fluid pressure actuated means cooperatively mounted between the plunger and the cylinder and adapted variably to restrict the flow of fluid from the cylinder to develop fluid pressure proportionate to the position of the accelerator pedal.

References Cited in the file of this patent

UNITED STATES PATENTS

| Number | Name | Date |
|---|---|---|
| 892,450 | Robinson | July 7, 1908 |
| 1,216,872 | Sowden | Feb. 20, 1917 |
| 1,581,454 | Larson | Apr. 20, 1926 |
| 2,073,357 | Wemp | Mar. 9, 1937 |
| 2,103,540 | Livermore | Dec. 28, 1937 |
| 2,105,625 | Wichendahl | Jan. 18, 1938 |
| 2,204,872 | Thompson | June 18, 1940 |
| 2,237,944 | Maurer | Apr. 18, 1941 |
| 2,332,593 | Nutt et al. | Oct. 26, 1943 |
| 2,368,684 | Simpson | Feb. 6, 1945 |
| 2,374,303 | Osborne | Apr. 24, 1945 |
| 2,449,586 | Carnagua | Sept. 21, 1948 |
| 2,454,614 | Peterson | Nov. 23, 1948 |
| 2,480,933 | Jandasek | Sept. 6, 1949 |
| 2,495,515 | Foley | Jan. 24, 1950 |

FOREIGN PATENTS

| Number | Country | Date |
|---|---|---|
| 607,120 | Great Britain | Aug. 26, 1948 |